United States Patent
Fong et al.

(10) Patent No.: US 11,882,559 B2
(45) Date of Patent: Jan. 23, 2024

(54) TECHNIQUES FOR RELEASING SIDELINK RESOURCES RELATED TO SIDELINK COMMUNICATIONS

(71) Applicant: QUALCOMM Incorporated, San Diego, CA (US)

(72) Inventors: Lik Hang Silas Fong, Bridgewater, NJ (US); Piyush Gupta, Bridgewater, NJ (US); Xiaojie Wang, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 17/404,463

(22) Filed: Aug. 17, 2021

(65) Prior Publication Data

US 2022/0061040 A1 Feb. 24, 2022

Related U.S. Application Data

(60) Provisional application No. 63/068,804, filed on Aug. 21, 2020.

(51) Int. Cl.
*H04W 4/00* (2018.01)
*H04W 72/20* (2023.01)
*H04W 72/0446* (2023.01)

(52) U.S. Cl.
CPC ....... *H04W 72/20* (2023.01); *H04W 72/0446* (2013.01)

(58) Field of Classification Search
CPC . H04W 72/20; H04W 72/0446; H04W 72/23; H04W 4/40
See application file for complete search history.

(56) References Cited

U.S. PATENT DOCUMENTS

| | | | | |
|---|---|---|---|---|
| 11,546,115 | B2* | 1/2023 | Hui | H04W 72/569 |
| 2019/0342944 | A1* | 11/2019 | Chatterjee | H04L 5/0082 |
| 2020/0037343 | A1* | 1/2020 | He | H04W 28/0268 |
| 2021/0028891 | A1* | 1/2021 | Zhou | H04W 4/40 |
| 2022/0109527 | A1* | 4/2022 | Hwang | H04W 72/23 |
| 2022/0116927 | A1* | 4/2022 | Wang | H04L 5/0044 |

(Continued)

OTHER PUBLICATIONS

International Search Report and Written Opinion—PCT/US2021/046508—ISA/EPO—dated Dec. 8, 2021.

(Continued)

*Primary Examiner* — Abdelnabi O Musa
(74) *Attorney, Agent, or Firm* — Holland & Hart LLP

(57) ABSTRACT

Methods, systems, and devices for wireless communications are described. A first device, which may be a user equipment (UE), may transmit a sidelink control information SCI) message (e.g., an SCI-1 message) on a physical sidelink control channel (PSCCH) to a group of devices. The SCI may message may reserve a set of sidelink resources for a sidelink communication between the first device and a second device of the group of devices. The first device may receive an acknowledgment (ACK) message on a physical sidelink feedback channel (PSFCH) from the second device. Based on receiving the ACK message, the first device may release the set of sidelink resources and may transmit a release message (e.g., a physical sidelink release channel (PSRCH) message) on a PSRCH that includes an indication of the released set of sidelink resources.

44 Claims, 22 Drawing Sheets

(56) References Cited

U.S. PATENT DOCUMENTS

| | | | | |
|---|---|---|---|---|
| 2022/0232525 A1* | 7/2022 | Lee | ...................... | H04L 5/0051 |
| 2022/0255680 A1* | 8/2022 | Moon | ................... | H04W 72/21 |
| 2022/0287008 A1* | 9/2022 | Kang | ................... | H04W 72/02 |
| 2022/0322363 A1* | 10/2022 | Yang | ................... | H04W 72/02 |
| 2022/0394560 A1* | 12/2022 | Yu | .................... | H04W 72/0446 |
| 2022/0399963 A1* | 12/2022 | Lee | ...................... | H04L 1/1893 |
| 2023/0036504 A1* | 2/2023 | Sun | ...................... | H04L 1/1825 |

OTHER PUBLICATIONS

ITRI: "Considerations on Mode 2 Latency Enhancement", 3GPP TSG RAN WG1 #102-e, 3GPP Draft, R1-2005612, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), 4 Pages, XP051914993, Retrieved from the Internet: URL: https://ftp.3gpp.org/tsg_ran/WG1_RL1/TSGR1_102-e/Docs/R1-2005612.zip, R1-2005612.docx, [retrieved on Aug. 7, 2020].

LG Electronics: "Discussion on Feasibility and Benefits for Mode 2 Enhancement", 3GPP Draft, 3GPP TSG RAN WG1 Meeting #102-e, R1-2005749, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020 (Aug. 8, 2020), XP051917712, 9 Pages, Retrieved from the Internet: URL: https://ftp.3gpp.org/tsg_ran/WG1_RL1/TSGR1_102-e/Docs/R1-2005749.zip R1-2005749 Discussion on sidelink mode 2 enhancement.docx [retrieved on Aug. 8, 2020] section 1, p. 1 section 2.1, p. 1-p. 2, figure 1 p. 3, figure 3, the whole document, pp. 1 and 2, sub-section Extension of resource reservation 11 and p. 4, sub-sections, "Release of reserved resources" and "Recommendation of transmission characteristics during a certain time duration".

* cited by examiner

TECHNIQUES FOR RELEASING SIDELINK RESOURCES RELATED TO SIDELINK COMMUNICATIONS

CROSS REFERENCE

The present Application for Patent claims the benefit of U.S. Provisional Patent Application No. 63/068,804 by FONG et al., entitled "TECHNIQUES FOR RELEASING SIDELINK RESOURCES RELATED TO SIDELINK COMMUNICATIONS," filed Aug. 21, 2020, assigned to the assignee hereof, and expressly incorporated by reference herein.

INTRODUCTION

The following relates to wireless communications, and more specifically to managing sidelink resources.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of sidelink communication at a first device in a wireless communication system is described. The method may include transmitting a sidelink control information (SCI) message on a physical sidelink control channel (PSCCH) to a group of devices, the SCI message reserving a set of sidelink resources for the sidelink communication between the first device and a second device of the group of devices, releasing the set of sidelink resources based on receiving, from the second device, an acknowledgment message on a physical sidelink feedback channel (PSFCH), and transmitting a physical sidelink release channel (PSRCH) message on a PSRCH, the PSRCH message including an indication of the released set of sidelink resources.

An apparatus for sidelink communication in a wireless communication system is described. The apparatus may include a processor and memory coupled to the processor, the processor and memory configured to transmit a SCI message on a PSCCH to a group of apparatuses, the SCI message reserving a set of sidelink resources for the sidelink communication between the apparatus and a second apparatus of the group of apparatuses, release the set of sidelink resources based on receiving, from the second apparatus, an acknowledgment message on a PSFCH, and transmit a PSRCH message on a PSRCH, the PSRCH message including an indication of the released set of sidelink resources.

Another apparatus for sidelink communication in a wireless communication system is described. The apparatus may include means for transmitting a SCI message on a PSCCH to a group of apparatuses, the SCI message reserving a set of sidelink resources for the sidelink communication between the apparatus and a second apparatus of the group of apparatuses, releasing the set of sidelink resources based on receiving, from the second apparatus, an acknowledgment message on a PSFCH, and transmitting a PSRCH message on a PSRCH, the PSRCH message including an indication of the released set of sidelink resources.

A non-transitory computer-readable medium storing code for sidelink communication at a first device in a wireless communication system is described. The code may include instructions executable by a processor to transmit a SCI message on a PSCCH to a group of devices, the SCI message reserving a set of sidelink resources for the sidelink communication between the first device and a second device of the group of devices, release the set of sidelink resources based on receiving, from the second device, an acknowledgment message on a PSFCH, and transmit a PSRCH message on a PSRCH, the PSRCH message including an indication of the released set of sidelink resources.

Some examples of the method, apparatuses, and non-transitory computer-readable medium described herein may further include operations, features, means, or instructions for determining, in response to transmitting the SCI message on the PSCCH, a set of PSRCH resources, and transmitting the PSRCH message on the PSRCH using the set of PSRCH resources.

Some examples of the method, apparatuses, and non-transitory computer-readable medium described herein may further include operations, features, means, or instructions for transmitting, in response to receiving the acknowledgment message on the PSFCH, the PSRCH message on the PSRCH based on the acknowledgment message including a positive acknowledgment.

Some examples of the method, apparatuses, and non-transitory computer-readable medium described herein may further include operations, features, means, or instructions for broadcasting, to the group of devices, the PSRCH message on the PSRCH.

Some examples of the method, apparatuses, and non-transitory computer-readable medium described herein may further include operations, features, means, or instructions for determining a power level to broadcast the PSRCH message on the PSRCH based on transmitting the SCI message on the PSCCH, and broadcasting, to the group of devices, the PSRCH message on the PSRCH using the determined power level.

Some examples of the method, apparatuses, and non-transitory computer-readable medium described herein may further include operations, features, means, or instructions for determining a slot and a subset of physical resource blocks in the slot to transmit the PSRCH, and mapping the SCI message to the slot based on the slot including the SCI message or the slot including the PSFCH, or both.

Some examples of the method, apparatuses, and non-transitory computer-readable medium described herein may further include operations, features, means, or instructions for mapping the SCI message to a subset of physical resource blocks in the slot based on a beginning subchannel of the SCI message.

Some examples of the method, apparatuses, and non-transitory computer-readable medium described herein may further include operations, features, means, or instructions for determining one or more information bits associated with the SCI message, and mapping the SCI message to the PSRCH message based on the determined one or more information bits associated with the SCI message.

Some examples of the method, apparatuses, and non-transitory computer-readable medium described herein may further include operations, features, means, or instructions for determining, in a slot, a subset of physical resource blocks associated with transmitting the PSRCH message, and mapping the SCI message to the PSRCH message based on the subset of physical resource blocks in the slot.

Some examples of the method, apparatuses, and non-transitory computer-readable medium described herein may further include operations, features, means, or instructions for determining that one or more PSRCH resources associated with the PSRCH may be periodic.

In some examples of the method, apparatuses, and non-transitory computer-readable medium described herein, the one or more PSRCH resources associated with the PSRCH may be preconfigured.

In some examples of the method, apparatuses, and non-transitory computer-readable medium described herein, a periodicity of the one or more PSRCH resources associated with the PSRCH relates to a periodicity of one or more PSFCH resources associated with the PSFCH.

Some examples of the method, apparatuses, and non-transitory computer-readable medium described herein may further include operations, features, means, or instructions for determining that the PSRCH spans over all physical resource blocks of at least one symbol in a slot.

Some examples of the method, apparatuses, and non-transitory computer-readable medium described herein may further include operations, features, means, or instructions for determining the PSRCH spans over a subset of physical resource blocks of at least one symbol in a slot associated with the PSFCH.

Some examples of the method, apparatuses, and non-transitory computer-readable medium described herein may further include operations, features, means, or instructions for determining a physical resource block set associated with the PSRCH may be orthogonal to a physical resource block set associated with the PSFCH in a slot.

Some examples of the method, apparatuses, and non-transitory computer-readable medium described herein may further include operations, features, means, or instructions for mapping one or more PSRCH resources to a slot associated with the PSRCH following a previous slot associated with the PSFCH related to the SCI message.

Some examples of the method, apparatuses, and non-transitory computer-readable medium described herein may further include operations, features, means, or instructions for mapping one or more PSRCH resources to a subset of physical resource blocks within one or more subchannels associated with the physical sidelink shared channel (PSSCH) related to the SCI message, the subset of physical resource blocks corresponds to a set of physical resource blocks configured for the PSRCH.

Some examples of the method, apparatuses, and non-transitory computer-readable medium described herein may further include operations, features, means, or instructions for determining a common subset of physical resource blocks associated with the PSRCH, and mapping the SCI message to the PSRCH based on determining the common subset of physical resource blocks.

Some examples of the method, apparatuses, and non-transitory computer-readable medium described herein may further include operations, features, means, or instructions for mapping the SCI message to the PSRCH based on a modulo operation on a cyclic redundancy check bit of the SCI.

Some examples of the method, apparatuses, and non-transitory computer-readable medium described herein may further include operations, features, means, or instructions for determining a format associated with the PSRCH message, the format including a cyclic-shift of a sequence, and transmitting the PSRCH message based on the format.

In some examples of the method, apparatuses, and non-transitory computer-readable medium described herein, the sequence includes a Zadoff-Chu sequence.

A method of sidelink communication at a first device in a wireless communication system is described. The method may include monitoring a sidelink channel and receiving a PSRCH message on a PSRCH from a second device, the PSRCH message including an indication that a set of sidelink resources reserved for sidelink communications between the second device and a third device are released.

An apparatus for sidelink communication at a first device in a wireless communication system is described. The apparatus may include a processor and memory coupled to the processor, the processor and memory configured to monitor a sidelink channel and receive a PSRCH message on a PSRCH from a second device, the PSRCH message including an indication that a set of sidelink resources reserved for sidelink communications between the second device and a third device are released.

Another apparatus for sidelink communication at a first device in a wireless communication system is described. The apparatus may include means for monitoring a sidelink channel and receiving a PSRCH message on a PSRCH from a second device, the PSRCH message including an indication that a set of sidelink resources reserved for sidelink communications between the second device and a third device are released.

A non-transitory computer-readable medium storing code for sidelink communication at a first device in a wireless communication system is described. The code may include instructions executable by a processor to monitor a sidelink channel and receive a PSRCH message on a PSRCH from a second device, the PSRCH message including an indication that a set of sidelink resources reserved for sidelink communications between the second device and a third device are released.

Some examples of the method, apparatuses, and non-transitory computer-readable medium described herein may further include operations, features, means, or instructions for receiving a SCI message on a PSCCH from the second device, the SCI message reserving the set of sidelink resources for the sidelink communication between the second device and the third device, and monitoring the sidelink channel for the PSRCH message based on receiving the SCI message on the PSCCH from the second device.

Some examples of the method, apparatuses, and non-transitory computer-readable medium described herein may further include operations, features, means, or instructions for determining, in response to receiving the SCI message on the PSCCH, a set of PSRCH resources, and receiving the PSRCH message on the PSRCH using the set of PSRCH resources.

Some examples of the method, apparatuses, and non-transitory computer-readable medium described herein may further include operations, features, means, or instructions for determining a slot and a subset of physical resource blocks in the slot to transmit the PSRCH, and mapping the SCI message to the slot based on the slot including the SCI message or the slot including the PSFCH, or both.

Some examples of the method, apparatuses, and non-transitory computer-readable medium described herein may further include operations, features, means, or instructions for mapping the SCI message to a subset of physical resource blocks in the slot based on a beginning subchannel of the SCI message.

Some examples of the method, apparatuses, and non-transitory computer-readable medium described herein may further include operations, features, means, or instructions for determining one or more information bits associated with the SCI message, and mapping the SCI message to the PSRCH message based on the determined one or more information bits associated with the SCI message.

Some examples of the method, apparatuses, and non-transitory computer-readable medium described herein may further include operations, features, means, or instructions for determining, in a slot, a subset of physical resource blocks associated with transmitting the PSRCH message, and mapping the SCI message to the PSRCH message based on the subset of physical resource blocks in the slot.

Some examples of the method, apparatuses, and non-transitory computer-readable medium described herein may further include operations, features, means, or instructions for determining that one or more PSRCH resources associated with the PSRCH may be periodic.

In some examples of the method, apparatuses, and non-transitory computer-readable medium described herein, the one or more PSRCH resources associated with the PSRCH may be preconfigured.

In some examples of the method, apparatuses, and non-transitory computer-readable medium described herein, a periodicity of the one or more PSRCH resources associated with the PSRCH relates to a periodicity of one or more PSFCH resources associated with a PSFCH.

Some examples of the method, apparatuses, and non-transitory computer-readable medium described herein may further include operations, features, means, or instructions for determining that the PSRCH spans over all physical resource blocks of at least one symbol in a slot.

Some examples of the method, apparatuses, and non-transitory computer-readable medium described herein may further include operations, features, means, or instructions for determining the PSRCH spans over a subset of physical resource blocks of at least one symbol in a slot associated with a PSFCH.

Some examples of the method, apparatuses, and non-transitory computer-readable medium described herein may further include operations, features, means, or instructions for determining a physical resource block set associated with the PSRCH may be orthogonal to a physical resource block set associated with a PSFCH in a slot.

Some examples of the method, apparatuses, and non-transitory computer-readable medium described herein may further include operations, features, means, or instructions for mapping one or more PSRCH resources to a slot associated with the PSRCH following a previous slot associated with a PSFCH related to the SCI message.

Some examples of the method, apparatuses, and non-transitory computer-readable medium described herein may further include operations, features, means, or instructions for mapping one or more PSRCH resources to a subset of physical resource blocks within one or more subchannels associated with the PSSCH related to the SCI message, the subset of physical resource blocks corresponds to a set of physical resource blocks configured for the PSRCH.

A method for sidelink communication at a device is described. The method may include receiving an acknowledgment message on a PSFCH. In some examples, the acknowledgment message may acknowledge the sidelink communication on a first subset of sidelink resources of a set of sidelink resources. The method may further include transmitting a PSRCH message on a PSRCH based on the acknowledgment message. In some examples, the PSRCH message may include an indication of releasing a second subset of sidelink resources of the set of sidelink resources.

An apparatus for sidelink communication at a device is described. The apparatus may include a processor, memory coupled with the processor, and instructions stored in the memory. The instructions may be executable by the processor to cause the apparatus to receive an acknowledgment message on a PSFCH, the acknowledgment message acknowledging the sidelink communication on a first subset of sidelink resources of a set of sidelink resources and transmit a PSRCH message on a PSRCH based on the acknowledgment message, the PSRCH message including an indication of releasing a second subset of sidelink resources of the set of sidelink resources.

Another apparatus for sidelink communication at a device is described. The apparatus may include means for receiving an acknowledgment message on a PSFCH, the acknowledgment message acknowledging the sidelink communication on a first subset of sidelink resources of a set of sidelink resources and means for transmitting a PSRCH message on a PSRCH based on the acknowledgment message, the PSRCH message including an indication of releasing a second subset of sidelink resources of the set of sidelink resources.

A non-transitory computer-readable medium storing code for sidelink communication at a device is described. The code may include instructions executable by a processor to receive an acknowledgment message on a PSFCH, the acknowledgment message acknowledging the sidelink communication on a first subset of sidelink resources of a set of sidelink resources and transmit a PSRCH message on a PSRCH based on the acknowledgment message, the PSRCH message including an indication of releasing a second subset of sidelink resources of the set of sidelink resources.

Some examples of the method, apparatuses, and non-transitory computer-readable medium described herein may further include operations, features, means, or instructions for transmitting a SCI message on a PSCCH to a group of devices, the SCI message reserving the set of sidelink resources for the sidelink communication.

Some examples of the method, apparatuses, and non-transitory computer-readable medium described herein may further include operations, features, means, or instructions for determining, in response to transmitting the SCI message on the PSCCH, a set of PSRCH resources and transmitting the PSRCH message on the PSRCH using the set of PSRCH resources.

In some examples of the method, apparatuses, and non-transitory computer-readable medium described herein, broadcasting, to the group of devices, the PSRCH message on the PSRCH.

Some examples of the method, apparatuses, and non-transitory computer-readable medium described herein may further include operations, features, means, or instructions for determining a power level to broadcast the PSRCH message on the PSRCH based on transmitting the SCI message on the PSCCH and broadcasting, to the group of devices, the PSRCH message on the PSRCH using the determined power level.

Some examples of the method, apparatuses, and non-transitory computer-readable medium described herein may further include operations, features, means, or instructions for determining a slot and a subset of physical resource blocks in the slot to transmit the PSRCH and mapping the SCI message to the slot based on the slot including the SCI message or the slot including the PSFCH, or both.

Some examples of the method, apparatuses, and non-transitory computer-readable medium described herein may further include operations, features, means, or instructions for mapping the SCI message to the subset of physical resource blocks in the slot based on a beginning subchannel of the SCI message.

Some examples of the method, apparatuses, and non-transitory computer-readable medium described herein may further include operations, features, means, or instructions for determining one or more information bits associated with the SCI message and mapping the SCI message to the PSRCH message based on the determined one or more information bits associated with the SCI message.

Some examples of the method, apparatuses, and non-transitory computer-readable medium described herein may further include operations, features, means, or instructions for determining, in a slot, a subset of physical resource blocks associated with transmitting the PSRCH message and mapping the SCI message to the PSRCH message based on the subset of physical resource blocks in the slot.

Some examples of the method, apparatuses, and non-transitory computer-readable medium described herein may further include operations, features, means, or instructions for mapping one or more PSRCH resources to a slot associated with the PSRCH following a previous slot associated with the PSFCH related to a SCI message.

Some examples of the method, apparatuses, and non-transitory computer-readable medium described herein may further include operations, features, means, or instructions for mapping one or more PSRCH resources to a subset of physical resource blocks within one or more subchannels associated with a PSSCH related to a SCI message, the subset of physical resource blocks corresponds to a set of physical resource blocks configured for the PSRCH.

In some examples of the method, apparatuses, and non-transitory computer-readable medium described herein, one or more PSRCH resources associated with the PSRCH may be periodic or preconfigured, or both, and a periodicity of the one or more PSRCH resources associated with the PSRCH relates to a periodicity of one or more PSFCH resources associated with the PSFCH.

Some examples of the method, apparatuses, and non-transitory computer-readable medium described herein may further include operations, features, means, or instructions for determining that the PSRCH spans over all physical resource blocks of at least one symbol in a slot.

Some examples of the method, apparatuses, and non-transitory computer-readable medium described herein may further include operations, features, means, or instructions for determining the PSRCH spans over a subset of physical resource blocks of at least one symbol in a slot associated with the PSFCH.

Some examples of the method, apparatuses, and non-transitory computer-readable medium described herein may further include operations, features, means, or instructions for determining a physical resource block set associated with the PSRCH may be orthogonal to a physical resource block set associated with the PSFCH in a slot.

Some examples of the method, apparatuses, and non-transitory computer-readable medium described herein may further include operations, features, means, or instructions for determining a common subset of physical resource blocks associated with the PSRCH, where the common subset of physical resource blocks may be shared for a group of devices and mapping a SCI message to the PSRCH based on determining the common subset of physical resource blocks.

Some examples of the method, apparatuses, and non-transitory computer-readable medium described herein may further include operations, features, means, or instructions for mapping the SCI message to the PSRCH based on a modulo operation on a cyclic redundancy check bit of the SCI message.

Some examples of the method, apparatuses, and non-transitory computer-readable medium described herein may further include operations, features, means, or instructions for determining a format associated with the PSRCH message, the format including a cyclic-shift of a sequence and transmitting the PSRCH message based on the format, the method, apparatuses, and non-transitory computer-readable medium described herein may further include operations, features, means, or instructions may further provide for an antenna array configured to transmit the PSRCH message based on the format.

A method for sidelink communication at a device is described. The method may include monitoring a PSRCH and receiving a PSRCH message on the PSRCH, the PSRCH message including an indication that a set of sidelink resources reserved for sidelink communication are released.

An apparatus for sidelink communication at a device is described. The apparatus may include a processor, memory coupled with the processor, and instructions stored in the memory. The instructions may be executable by the processor to cause the apparatus to monitor a PSRCH and receive a PSRCH message on the PSRCH, the PSRCH message including an indication that a set of sidelink resources reserved for sidelink communication are released.

Another apparatus for sidelink communication at a device is described. The apparatus may include means for monitoring a PSRCH and means for receiving a PSRCH message on the PSRCH, the PSRCH message including an indication that a set of sidelink resources reserved for sidelink communication are released.

A non-transitory computer-readable medium storing code for sidelink communication at a device is described. The code may include instructions executable by a processor to monitor a PSRCH and receive a PSRCH message on the PSRCH, the PSRCH message including an indication that a set of sidelink resources reserved for sidelink communication are released.

Some examples of the method, apparatuses, and non-transitory computer-readable medium described herein may further include operations, features, means, or instructions for receiving a SCI message on a PSCCH, the SCI message reserving the set of sidelink resources for the sidelink communication and monitoring the PSRCH for the PSRCH message based on receiving the SCI message on the PSCCH.

Some examples of the method, apparatuses, and non-transitory computer-readable medium described herein may further include operations, features, means, or instructions for determining, in response to receiving the SCI message on the PSCCH, a set of PSRCH resources and receiving the PSRCH message on the PSRCH using the set of PSRCH resources.

Some examples of the method, apparatuses, and non-transitory computer-readable medium described herein may further include operations, features, means, or instructions for determining a slot and a subset of physical resource blocks in the slot to transmit the PSRCH and mapping the SCI message to the slot based on the slot including the SCI message or the slot including a PSFCH, or both.

Some examples of the method, apparatuses, and non-transitory computer-readable medium described herein may further include operations, features, means, or instructions for mapping the SCI message to the subset of physical resource blocks in the slot based on a beginning subchannel of the SCI message.

Some examples of the method, apparatuses, and non-transitory computer-readable medium described herein may further include operations, features, means, or instructions for determining one or more information bits associated with the SCI message and mapping the SCI message to the PSRCH message based on the determined one or more information bits associated with the SCI message.

Some examples of the method, apparatuses, and non-transitory computer-readable medium described herein may further include operations, features, means, or instructions for determining, in a slot, a subset of physical resource blocks associated with transmitting the PSRCH message and mapping the SCI message to the PSRCH message based on the subset of physical resource blocks in the slot.

Some examples of the method, apparatuses, and non-transitory computer-readable medium described herein may further include operations, features, means, or instructions for determining that one or more PSRCH resources associated with the PSRCH may be periodic.

In some examples of the method, apparatuses, and non-transitory computer-readable medium described herein, the one or more PSRCH resources associated with the PSRCH may be preconfigured.

In some examples of the method, apparatuses, and non-transitory computer-readable medium described herein, a periodicity of the one or more PSRCH resources associated with the PSRCH relates to a periodicity of one or more PSFCH resources associated with a PSFCH.

DETAILED DESCRIPTION

Figure 1:
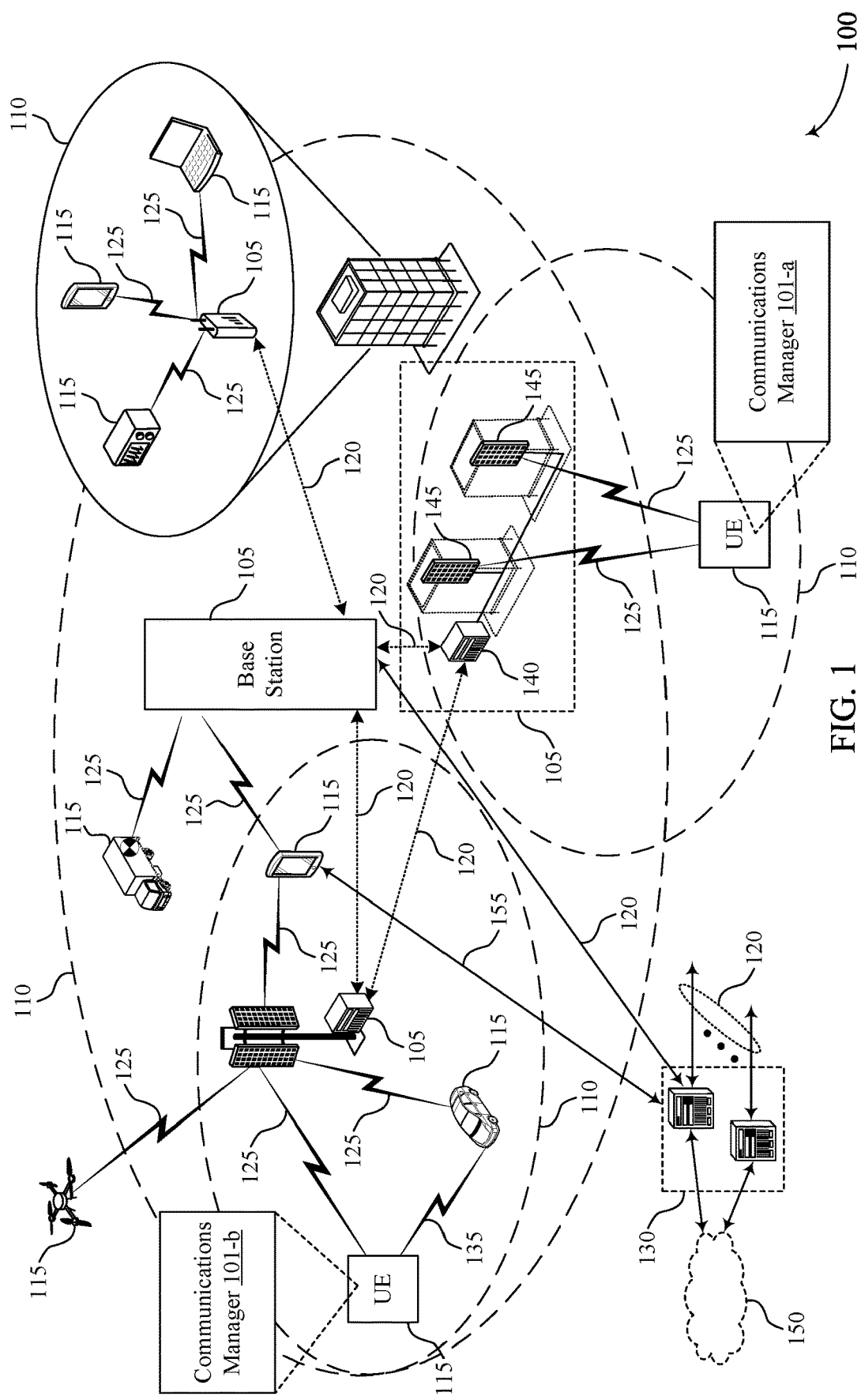
FIGS. 1 and 2 illustrate examples of wireless communications systems that support techniques for releasing sidelink resources related to sidelink communications in accordance with one or more aspects of the present disclosure.

Some wireless communications systems may support access links (e.g., a Uu link) and sidelinks (e.g., a PC5 link) for communications between communication devices. Access links may refer to communication links through which a communication device (e.g., a UE) accesses a wireless communications system, such as a communication link between a UE and a base station. For example, an access link may support uplink signaling, downlink signaling, connection procedures, etc. Sidelinks may refer to any communication link between similar communication devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs. As used herein, the term "sidelink communication" may include one or more of transmitting or receiving sidelink control information or sidelink data over a sidelink channel.

To support sidelink communications (e.g., sidelink data, SCI, or other sidelink information), a wireless communications system may be configured with sidelink channels such as sidelink control channels (e.g., a PSCCH), sidelink data channels (e.g., a PSSCH), and sidelink feedback channels (e.g., a PSFCH), among other sidelink channels. As used herein, the term "physical sidelink feedback channel" may be a communication channel for one or more of transmitting or receiving feedback information (e.g., an acknowledgment message) associated with sidelink communication. A UE may share sidelink resource information with other UEs in a group over one or more sidelink channels. For example, a UE may transmit to, or receive from, other UEs SCI messages (e.g., an SCI-1 message, an SCI-2 message, or other SCI message) over a sidelink control channel. As used herein, the term "sidelink channel" may be a communication channel for one or more of transmitting or receiving sidelink communication.

A UE of a group of UEs may determine to transmit sidelink data (e.g., a transmit UE) to another UE of the group of UEs (e.g., a receive UE) over one or more sidelink channels. The transmit UE may reserve sidelink resources (e.g., from a set of sidelink resources configured by a base station, or from a set of pre-configured sidelink resources), to transmit the sidelink data, by transmitting an SCI message to the group of UEs. As used herein, the term "a subset of sidelink resources" and "a set of sidelink resources" may include one or more time and frequency resources, such as symbol, slots, subcarriers, carriers, or any combination thereof. In some cases, the transmit UE may reserve the sidelink resources for one or multiple slots (e.g., one slot, two slots, three slots, or any other number of slots). In some cases, the transmit UE may choose to release (i.e., not use) at least some of the reserved sidelink resources. For example, if the transmit UE reserves the sidelink resources for two slots and receives a positive feedback message, the transmit UE may choose to release the sidelink resources for a following slot. The reserved sidelink resources may therefore be available for use by other UEs of the group, however, the other UEs of the group may not be aware that the sidelink resources are now available.

Techniques described herein are directed to the release of sidelink resources via a release message. For example, the transmit UE may reserve sidelink resources, to transmit sidelink data to another UE of the group of UEs (e.g., a receive UE), by transmitting an SCI message to the group of UEs. The transmit UE may transmit the sidelink data to the receive UE in one or multiple slots that include the reserved sidelink resources. If the transmit UE receives a positive feedback message (e.g., a positive acknowledgment (ACK) message on a sidelink feedback channel) from the receive UE, the transmit UE may release any remaining sidelink resources and may transmit a release message on a sidelink release channel (e.g., a PSRCH (also referred to as physical sidelink resource release channel, a physical sidelink reservation release channel, a physical sidelink resource cancellation channel, a physical sidelink reservation cancellation channel, or the like (e.g., another sidelink release channel))) indicating the release of the sidelink resources to the other UEs of the group. As used herein, the term "physical sidelink release channel" may be a respective communication channel for one or more of transmitting or receiving a physical sidelink release channel message. As used herein, the term "physical sidelink release channel message" may include information indicating whether one or more sidelink resources are released (e.g., available for use by other devices in a wireless communications system or not used by a respective device). Another UE of the group of UEs other than the transmit UE (e.g., a listening UE) may monitor the sidelink release channel. The listening UE may receive the release message on the sidelink release channel and determine that the sidelink resources are available for use. As used herein, the term "acknowledgment message" may include feedback information associated with sidelink communication. For example, an acknowledgment message may indicate whether one or more of a transmission or a reception was successful or unsuccessful.

The described techniques may be employed to provide enhancements to the operation of UEs. For example, operations performed by the UEs may increase the efficiency and coordination for resource usage for sidelink communications. In some examples, transmitting a release message indicating the released sidelink resources may allow the UEs of the group to use sidelink resources that would otherwise go unused. In some other examples, transmitting a release message may increase spectral efficiency, and, in some examples, promote higher reliable communications.

Aspects of the disclosure are initially described in the context of wireless communications systems. Aspects of the disclosure are further illustrated by and described with reference to apparatus diagrams, system diagrams, and flow-charts that relate to techniques for releasing sidelink resources related to sidelink communications.

FIG. 1 illustrates an example of a wireless communications system 100 that supports techniques for releasing sidelink resources related to sidelink communications in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The wireless communications system 100 may support access links (e.g., a Uu link) and sidelinks (e.g., a PC5 link) for communications between one or more communication devices. To support sidelink communications (e.g., sidelink data, SCI, or other sidelink information), the wireless communications system 100 may be configured with sidelink channels such as sidelink control channels (e.g., a PSCCH), sidelink data channels (e.g., a PSSCH), and sidelink feedback channels (e.g., a PSFCH), among other sidelink channels. A UE 115 may share sidelink resource information with other UEs 115 in a group over one or more sidelink channels. For example, a UE 115 may transmit to, or receive from, other UEs 115 SCI messages (e.g., an SCI-1 message, and SCI-2 message, or other SCI message) over a sidelink control channel.

A first UE 115 of a group of UEs 115 may determine to transmit sidelink data (e.g., a transmit UE) to a second UE 115 of the group of UEs 115 (e.g., a receive UE) over one or more sidelink channels. The first UE 115 may reserve sidelink resources (e.g., from a set of sidelink resources configured by a base station, or from a set of pre-configured sidelink resources) to transmit the sidelink data by transmitting an SCI message to the group UEs 115. In some cases, the first UE 115 may reserve the sidelink resources for one or more slots (e.g., one slot, two slots, three slots, or any other number of slots). In some cases, the first UE 115 may choose to release (i.e., not use) at least some of the reserved sidelink resources. For example, if the first UE 115 reserves the sidelink resources for two slots and receives a positive feedback message, after the first slot, the first UE 115 may choose to release the sidelink resources for the second slot.

The reserved sidelink resources may therefore be available for use by other UEs 115 of the group, however, the other UEs 115 of the group may not be aware that the sidelink resources are now available. Thus, it may be desirable to improve efficiency and resource usage by providing a mechanism to signal to the other UEs 115 that the previously reserved sidelink resources are released and available.

The wireless communications system 100 may be configured to support releasing sidelink resources and signaling that the sidelink resources are available. For example, a first UE 115 may include a communications manager 101-a that enables the first UE 115 to transmit an SCI message to a group of UEs 115 on a sidelink control channel. The SCI message may reserve a set of sidelink resources for a sidelink communication between the first UE 115 and a second UE 115 of the group of UEs 115. The first UE 115 may receive a positive feedback message (e.g., an ACK message on a sidelink feedback channel) from the second UE 115. Based on receiving the feedback message, the first UE 115 may release the reserved set of sidelink resources and may transmit a release message (e.g., a PSRCH message) on a sidelink release channel (e.g., a PSRCH) indicating the release of the reserved set of sidelink resources. In some cases, the first UE 115 may broadcast the release message to the group of UEs 115 on the sidelink release channel.

A third UE 115 may include a communications manager 101-b that enables the third UE 115 to monitor a sidelink release channel for the release message. The third UE 115 may receive the SCI message that reserves the set of sidelink resources for the sidelink communication between the first UE 115 and the second UE 115. In some cases, the third UE 115 may monitor the sidelink release channel for the release message based on receiving the SCI message from the first UE 115. The third UE 115 may receive the release message on the sidelink release channel and may determine that the reserved set of sidelink resources are released and available. Likewise, the third UE 115 may reserve the released set of sidelink resources for sidelink communications with another UE 115 in the group of UEs 115.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
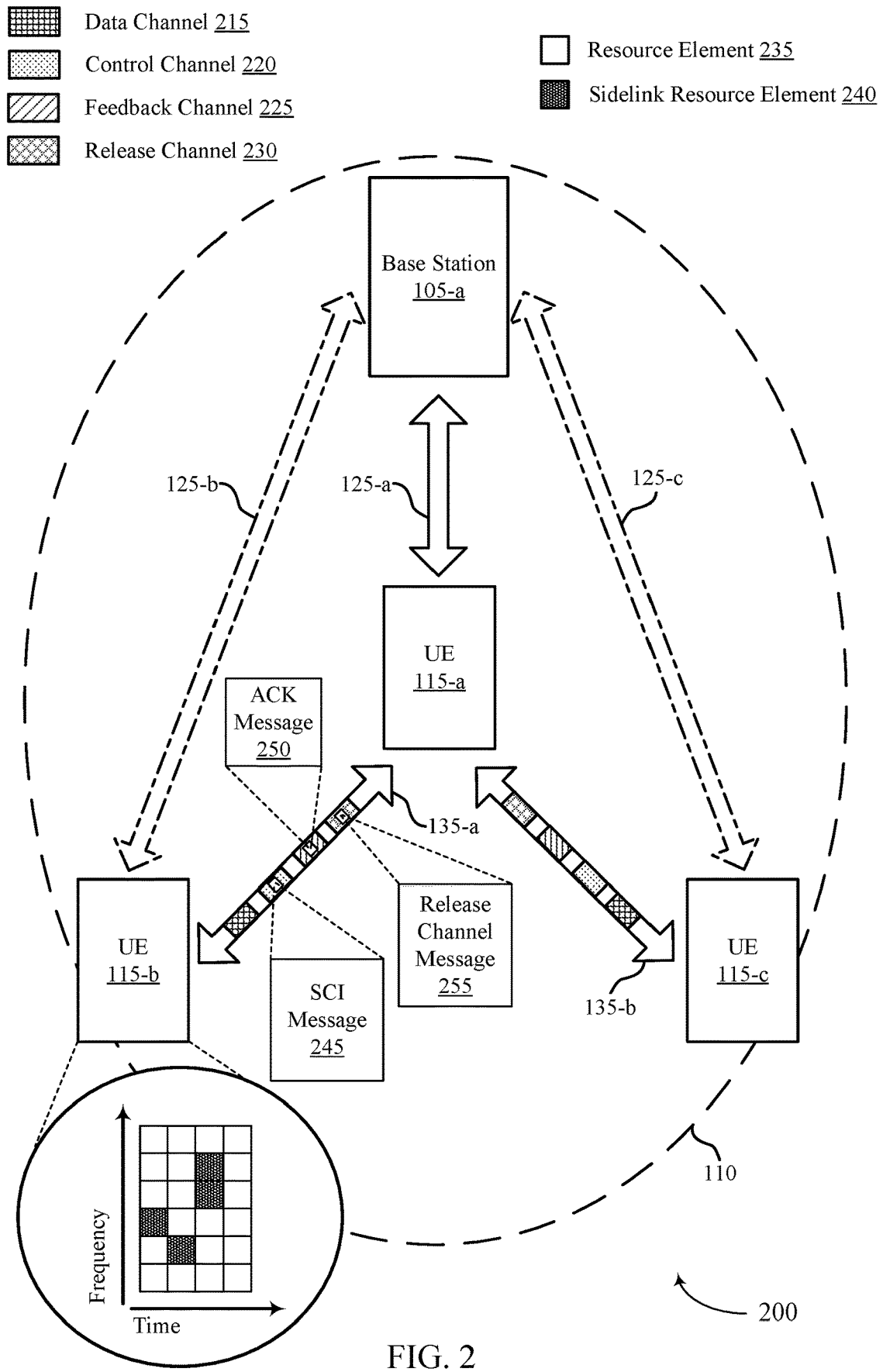

FIG. 2 illustrates an example of a wireless communications system 200 that supports techniques for releasing sidelink resources related to sidelink communications in accordance with one or more aspects of the present disclosure. The wireless communications system 200 may implement aspects of the wireless communications system 100. For example, the wireless communications system 200 may include a base station 105-a, a UE 115-a, a UE 115-b, and a UE 115-c, which may be examples of a base station 105 and a UE 115 as described with reference to FIG. 1. The base station 105-a and the UE 115-a, the UE 115-b, and the UE 115-c may communicate with one another via a communication link 125-a, a communication link 125-b, and a communication link 125-c, respectively, which may be examples of a communication link 125 as described with reference to FIG. 1. The UE 115-a may communicate with the UE 115-b via the communication link 135-a and may communicate with the UE 115-c via the communication link 135-b, which may be examples of a communication link 135 as described with reference to FIG. 1. The wireless communications system 200 may support multiple radio access technologies including 4G systems such as LTE systems, LTE-A systems, or LTE-A Pro systems, and 5G systems, which may be referred to as NR systems.

By way of example, the wireless communications system 200 may be an industrial Internet-of-Things (IIoT) communication system, for example, in the context of a wireless factory automation system, however, the techniques described herein may be applicable to any sidelink or message-based reservation system. For example, in the context of a wireless factory automation system (e.g., the wireless communications system 200), the base station 105-a may be mounted on a ceiling of a factory such that it may communicate with various wireless devices (e.g., the UE 115-a, the UE 115-b, the UE 115-c) within the factory. In this example, in some cases, the UE 115-a may include a wireless programmable logic controller (PLC), and one or more of the UE 115-b and the UE 115-c may include a wireless sensor/actuator (S/A). Accordingly, the PLC (e.g., the UE 115-a) may communicate with the base station 105-a via a Uu link (e.g., the communication link 125-a), and the S/A (e.g., the UE 115-b and the UE 115-c) may communicate with the PLC (e.g., the UE 115-a) via a PC5 link (e.g., the communication link 135-a, the communication link 135-b). In this example, the UE 115-a (e.g., PLC) may be mounted close to machinery and may be configured to communicate with a set of S/As (e.g., the UE 115-b and the UE 115-c) and/or other wireless devices. In some cases, a single factory may include 100-1000 PLCs, and each PLC may be communicatively coupled to 20-50 S/As.

The communication link 135-a between the UE 115-a and the UE 115-b and the communication link 135-b between the UE 115-a and the UE 115-c may be included within a sidelink network of the wireless communications system 200. The sidelink network (e.g., sidelink network including the communication link 135-a and the communication link 135-b) may be configurable to operate in a "Mode 1" and/or a "Mode 2." While operating in Mode 1, the sidelink network (e.g., the communication link 135-a and the communication link 135-b, or another sidelink communication link) may be managed (e.g., coordinated) by the base station 105-a. In this regard, during Mode 1 operation, the base station 105-a may manage resource allocation over the communication link 135-a and the communication link 135-b.

A set of sidelink resources or a subset of sidelink resources of the set of sidelink resources, or both, may include one or more sidelink resources that may span one or more resource elements 235, which may be used for various reasons including monitoring a data channel 215, a control channel 220, a feedback channel 225, or a release channel 230, among other operations that may be non-specific to sidelink communications. The one or more sidelink resources may span one or more sidelink resource elements 240 (e.g., symbols, slots, subcarriers, carriers). As illustrated in FIG. 2, one or more sidelink resources may be contiguous in a time domain. Additionally or alternatively, one or more sidelink resources may be contiguous in a frequency domain. In the example of FIG. 2, one or more UEs 115 (e.g., the UE 115-a, the UE 115-b, the UE 115-c, additional UEs 115) of the wireless communications system 200 may be configured to determine one or more sidelink resources to transmit one or more messages to one or more other UEs 115 of the group. For example, the UE 115-b may be configured to transmit a release channel message 255 on the release channel 230. In some examples, a UE 115-b may transmit the release channel message 255 based on receiving a positive feedback message (e.g., an ACK message 250) from the UE 115-a on the feedback channel 225.

While operating in Mode 2, the sidelink network may not be managed or coordinated by the base station 105-a. Without coordination or management of the resources of the sidelink network during the Mode 2 operation, the UEs 115 (e.g., the UE 115-a, the UE 115-b, the UE 115-c, additional UEs 115) of the wireless communications system 200 may follow contention-based access procedures in which the various UEs 115 may reserve sidelink resources of the sidelink network, including the communication link 135-a and the communication link 135-b. For example, during Mode 2 operation, the UE 115-a and the UE 115-b may monitor the sidelink network of the wireless communications system 200 to determine if other UEs 115 are attempting to transmit over the sidelink network. For instance, the UE 115-a, the UE 115-b, and the UE 115-c may decode sidelink control channel transmissions (e.g., SCI-1 messages, SCI-2 messages, request-to-send-messages) and may determine which sidelink resources are reserved for other sidelink communications based on measuring the reference signal received power (RSRP) and demodulation reference signals (DMRSs) of the control channel transmissions.

The UE 115-a, the UE 115-b, or the UE 115-c may select sidelink resources (e.g., from a set of sidelink resources configured by the base station 105-a, or from a set of pre-configured sidelink resources) that are not reserved and may reserve the sidelink resources by transmitting an SCI message (e.g., an SCI-1 message) to the other UEs 115. In some cases, the UE 115-a, the UE 115-b, or the UE 115-c may reserve the sidelink resources for one or more slots (e.g., one slot, two slots, three slots, or any other number of slots). In some cases, the UE 115-a, the UE 115-b, or the UE 115-c may choose to release at least some of the reserved sidelink resources. For example, in an IIoT system, a failure rate of a sidelink transmission in a first slot may be approximately one percent, and, therefore, many sidelink transmissions may not be re-transmitted (e.g., to ensure that a sidelink transmission was received). For example, if the UE 115-a, the UE 115-b, or the UE 115-c reserves the sidelink resources for two slots and receives a positive feedback message after the first slot, the UE 115-a, the UE 115-b, or the UE 115-c may choose to release the sidelink resources for the second slot. However, in the context of Mode 2 sidelink operation, the other UEs 115 may not be aware that the sidelink resources are now available. Thus, it may be desirable to improve efficiency and resource usage in wireless communications systems (e.g., the wireless communications system 200) by providing a mechanism to signal to the other UEs 115 that the previously reserved sidelink resources are released and available.

The present disclosure provides techniques for releasing sidelink resources and signaling that the sidelink resources are released and available. To support such techniques, the wireless communications system 200 may support sidelink communications over one or more channels. For example, the communication link 135-a and the communication link 135-b may support sidelink channels such as a sidelink data channel 215 (e.g., a PSSCH), a sidelink control channel 220 (e.g., a PSCCH), a sidelink feedback channel 225 (e.g., a PSFCH), and a sidelink release channel 230 (e.g., a PSRCH). A UE 115 (e.g., the UE 115-a) may transmit one or more SCI messages to a group of UEs 115 (e.g., the UE 115-b and the UE 115-c) to reserve sidelink resources for a sidelink communication with another UE 115 (e.g., the UE 115-b, the UE 115-c, or another UE 115 (not shown)). For example, the UE 115-a may determine to transmit sidelink information (e.g., sidelink data, SCI, or other sidelink information) to the UE 115-b. The UE 115-a may select available sidelink resources and transmit an SCI message (e.g., an SCI message 245) on the sidelink control channel 220 to the group of UEs 115 to reserve the sidelink resources for the sidelink communication between the UE 115-a and the UE 115-b. For example, the UE 115-a may transmit the SCI message 245 in a subchannel of a slot of the sidelink control channel 220 that allocates resources for the sidelink data channel 215 in the same slot and N' future slots (e.g., N'=1, 2, 3, or any other number of future slots).

The UE 115-a may communicate with the UE 115-b using the reserved sidelink resources. For example, the UE 115-a may transmit sidelink data on the sidelink data channel 215 using at least some of the reserved sidelink resources. In some cases, the UE 115-b may not receive the sidelink data and may transmit a negative feedback message (e.g., a negative acknowledgment (NACK) message) on the sidelink feedback channel 225 to notify the UE 115-a that the sidelink data was not received. Additionally or alternatively, the UE 115-b may not transmit a feedback message and the UE 115-a may determine that the sidelink data was not received based on not receiving a feedback message from the UE 115-b. Based on determining that the sidelink data was not received, the UE 115-a may retransmit the sidelink data using at least some of the reserved sidelink resources corresponding to a later slot. The UE 115-a and the UE 115-b may repeat this process until the UE 115-b successfully receives the sidelink data or until the UE 115-a uses all of the reserved sidelink resources. In some other cases, the UE 115-b may successfully receive the sidelink data and may transmit a positive feedback message (e.g., an ACK message 250) on the sidelink feedback channel 225. Based on receiving the ACK message 250, the UE 115-a may release any remaining sidelink resources that the UE 115-a had previously reserved.

The UE 115-a may transmit a release message (e.g., a PSRCH message) on the sidelink release channel 230 based on releasing the sidelink resources. The release message may include an indication of the released set of sidelink resources. In some examples, the UE 115-a may broadcast the release message to the group of UEs on the sidelink release channel 230. In some examples, the UE 115-a may determine a power level to broadcast the release message based on the SCI message used to reserve the sidelink resources. For example, the UE 115-a may broadcast the release message to the group of UEs 115 using the same power level with which it transmitted the SCI message. In this way, there may be a high likelihood that any UE 115 of the group of UEs 115 that received and decoded the SCI message may also receive and decode the release message. In some examples, the UE 115-a may determine resources of the sidelink release channel to use to transmit the release message (e.g., the release channel message 255) based on the SCI message (e.g., the SCI message 245). For example, the UE 115-a may map the SCI message 245 to the release channel message 255 so that the group of UEs 115 may determine which sidelink resources are released by the release channel message 255.

The UE 115-c may monitor the sidelink release channel 230 for the release message. For example, the UE 115-c may receive the SCI message that reserves the sidelink resources for the sidelink communication between the UE 115-a and the UE 115-b. In some cases, the UE 115-c may monitor the sidelink release channel 230 for the release message based on receiving the SCI message. The UE 115-c may receive the release message on the sidelink release channel 230 that includes the indication of the released set of sidelink resources. Based on receiving the release message, the UE 115-c may determine that the sidelink resources are available. In some examples, the UE 115-c may determine which sidelink resources are released based on mapping the SCI message to the release message. The wireless communications system 200 may, as a result, increase efficiency and coordination for resource usage in sidelink communications and, in some examples, may promote high reliability and low latency wireless communications. In some other examples, the wireless communications system 200 may provide power saving for the group of UEs 115.

Figure 3:
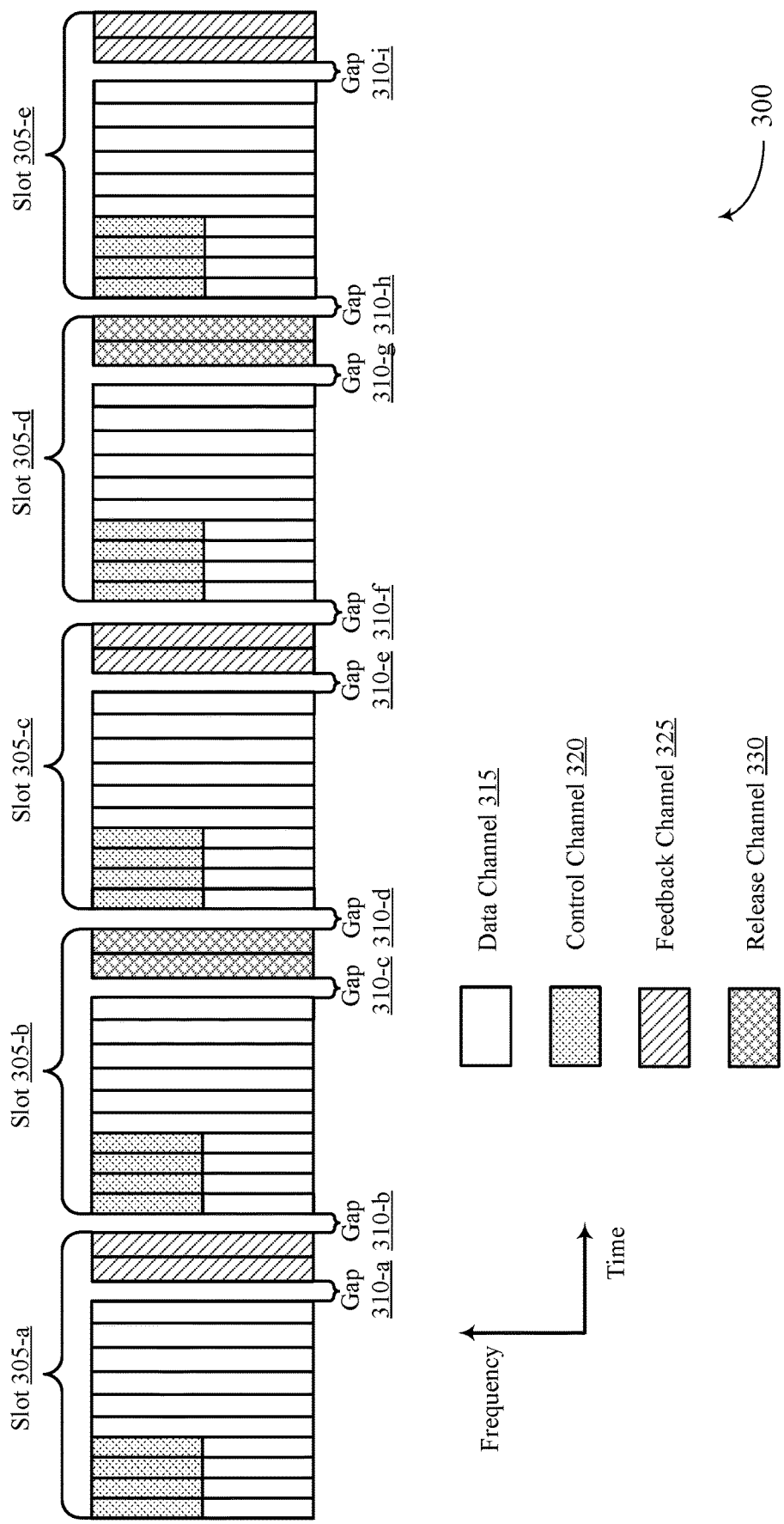
FIG. 3 illustrates an example of a resource mapping scheme that supports techniques for releasing sidelink resources related to sidelink communications in accordance with one or more aspects of the present disclosure.

FIG. 3 illustrates an example of a resource mapping scheme 300 that supports techniques for releasing sidelink resources related to sidelink communications in accordance with one or more aspects of the present disclosure. In some examples, the resource mapping scheme 300 may implement aspects of the wireless communications systems 100 and 200 as described with reference to FIGS. 1 and 2, respectively. For example, the resource mapping scheme 300 may be implemented a UE 115, which may be an example of a UE 115 as described with reference to FIGS. 1 and 2, respectively. The resource mapping scheme 300 may be implemented by the UE 115 to release sidelink resources and to signal the release of the sidelink resources to other UEs 115 to improve efficiency and resource usage for sidelink communications and promote highly reliable communications.

The resource mapping scheme 300 may illustrate example slots of sidelink transmissions. For example, the resource mapping scheme 300 may correspond to a slot 305-a, a slot 305-b, a slot 305-c, a slot 305-d, and a slot 305-e. Each slot 305 may include 14 symbol periods in a time domain in which OFDM symbols may be transmitted. In some cases, each slot 305 may include one or more gaps 310 in which no information is transmitted. Additionally, each slot 305 may include a set of resource blocks in a frequency domain. A UE 115 may use a slot 305 to carry sidelink information associated with one or more channels. For example, a UE 115 may transmit sidelink information associated with a sidelink data channel 315 (e.g., a PSSCH), a sidelink control channel 320 (e.g., a PSCCH), a sidelink feedback channel 325 (e.g., a PSFCH), or a sidelink release channel 330 (e.g., a PSRCH), or any combination thereof, in each slot 305.

The sidelink feedback channel 325 and the sidelink release channel 330 may be associated with a periodicity. For example, one or more sidelink feedback channel resources may be preconfigured for every N slots (e.g., every slot, two slots, four slots, or any number of slots) and one or more sidelink release channel resources may be preconfigured for every M slots (e.g., every slot, two slots, four slots, or any number of slots). In some cases, the periodicity of the one or more sidelink feedback channel resources may be related to the periodicity of the one or more sidelink release channel resources. For example, if the one or more sidelink feedback channel resources are preconfigured for every slot, the one or more sidelink release channel resources may be preconfigured for every slot, and so on. In the example of the resource mapping scheme 300, sidelink feedback channel resources and sidelink release channel resources may have a periodicity. For example, the sidelink feedback channel 325 is allocated for slots 305-*a*, 305-*c*, and 305-*e*, and the sidelink release channel 330 is allocated for slots 305-*b* and 305-*d*.

A first UE 115 of a group of UEs 115 may reserve sidelink resources for a sidelink communication with a second UE 115 of the group of UEs 115. For example, the first UE 115 may determine to transmit sidelink data to the second UE 115 on a sidelink data channel 315. The first UE 115 may transmit an SCI message using resources of the sidelink control channel 320 in the slot 305-*a* to reserve sidelink resources to transmit the sidelink data to the second UE 115. The first UE 115 may transmit the SCI message to the group of UEs 115 to indicate to the group of UEs 115 that it has reserved the sidelink resources. In some cases, the first UE 115 may transmit the SCI message in a subchannel of the sidelink control channel 320 of the slot 305-*a* that allocates resources for the sidelink data channel 315 of the slot 305-*a* and N' future slots (e.g., N'=1, 2, 3, or any other number of future slots each separated by a number of slots). For example, the SCI message may reserve resources of the sidelink data channel 315 for the slot 305-*a* and the slot 305-*e*. Thus, in the slot 305-*a*, the first UE 115 may transmit the sidelink data to the second UE 115 using the reserved sidelink resources and the second UE 115 may receive the sidelink data.

The slot 305-*b* may include resource allocations for a sidelink data channel 315, a sidelink control channel 320, and a sidelink release channel 330. In this example, the slot 305-*b* may not include a resource allocation for a sidelink feedback channel 325 because the periodicity of the sidelink feedback channel 325. Because the slot 305-*b* may not include a sidelink feedback channel, the second UE 115 may wait until the slot 305-*c* to transmit a feedback message in response to receiving the sidelink data in the slot 305-*a*. As a result, the first UE 115 may not know if the second UE 115 successfully received the sidelink data and may not transmit a release message on the sidelink release channel 330 of the slot 305-*b*.

The slot 305-*c* may include resource allocations for a sidelink data channel 315, a sidelink control channel 320, and a sidelink feedback channel 325. In this example, slot 305-*c* may not include a resource allocation for a sidelink release channel 330 because the periodicity of the sidelink release channel 330. The second UE 115 may transmit a positive feedback message (e.g., an ACK message) to the first UE 115 on the sidelink feedback channel 325. The first UE 115 may receive the positive feedback message on the sidelink feedback channel 325 and determine that it might not need to retransmit the sidelink data to the second UE 115. Based on receiving the positive feedback message and determining to not retransmit the sidelink data, the first UE 115 may release the sidelink resources. That is, the first UE 115 may determine to make the reserved sidelink resources of the slot 305-*e* available to use by other UEs 115 of the group of UEs 115.

During the slot 305-*d*, the first UE 115 may transmit a release message on the sidelink release channel 330 that includes an indication of the released sidelink resources. In some examples, the first UE 115 may broadcast the release message to the group of UEs on the sidelink release channel 330. In some examples, may determine a power level to broadcast the release message based on the SCI message transmitted in the slot 305-*a*. For example, the first UE 115 may broadcast the release message to the group of UEs 115 using the same power level with which it transmitted the SCI message. In this way, there may be a high likelihood that any UE 115 of the group of UEs 115 that received and decoded the SCI message may also receive and decode the release message.

In some examples, the first UE 115 may determine resources of the sidelink release channel to use to transmit the release message based on the SCI message transmitted in the slot 305-*a*. For example, the first UE 115 may map the SCI message to the release message so that the group of UEs may determine which sidelink resources (e.g., the sidelink resources of the slot 305-*e*) are released by the release message. In some examples, the first UE 115 may transmit the release message according to a preconfigured format. For example, the first UE 115 may determine that the preconfigured format of the release message includes a cyclic-shift of a sequence and transmit the release message according to the sequence. In some cases, the sequence may include a Zadoff-Chu sequence among other sequences.

A third UE 115 of the group of UEs 115 may monitor the sidelink release channel 330 of the slot 305-*d*. For example, the third UE 115 may receive the SCI message transmitted in the slot 305-*a* that reserves the sidelink resources for the sidelink communication between the first UE 115 and the second UE 115. In some cases, the third UE 115 may monitor the sidelink release channel 330 of the slot 305-*d* for the release message based on receiving the SCI message in the slot 305-*a*. The third UE 115 may receive the release message on the sidelink release channel 330 that includes the indication of the released set of sidelink resources of the slot 305-*e*. Based on receiving the release message, the third UE 115 may determine that the sidelink resources are available. In some examples, the third UE 115 may determine which sidelink resources are released based on mapping the SCI message to the release message.

FIGS. 4A, 4B, 4C, and 4D illustrate respective examples of resource mapping schemes 400-*a*, 400-*b*, 400-*c*, and 400-*d* that support techniques for releasing sidelink resources related to sidelink communications in accordance with one or more aspects of the present disclosure. In some examples, resource mapping schemes 400-*a*, 400-*b*, 400-*c*, and 400-*d* may implement aspects of the wireless communications systems 100 and 200 as described with reference to FIGS. 1 and 2, respectively. For example, one or more of the resource mapping schemes 400-*a*, 400-*b*, 400-*c*, and 400-*d* may be implemented by a UE 115, which may be an example of a UE 115 as described with reference to FIGS. 1 and 2. The resource mapping schemes 400-*a*, 400-*b*, 400-*c*, and 400-*d* may be implemented by the UE 115 to release sidelink resources and to signal the release of the sidelink resources to other UEs 115 to improve efficiency and resource usage for sidelink communications and promote highly reliable communications.

Each of the resource mapping schemes 400-*a*, 400-*b*, 400-*c*, and 400-*d* may correspond to a slot 405. Each slot 405 may include 14 symbol periods in a time domain. In some cases, each slot 405 may include one or more gaps 410 in which no information is transmitted. Additionally, each slot 405 may include a set of resource blocks in a frequency domain. A UE 115 may use a slot 405 to carry sidelink information associated with one or more channels. For example, a UE 115 may transmit sidelink information associated with a sidelink data channel 415 (e.g., a PSSCH), a sidelink control channel 420 (e.g., a PSCCH), a sidelink feedback channel 425 (e.g., a PSFCH), or a sidelink release channel 430 (e.g., a PSRCH), or any combination thereof, in each slot 405.

The UE 115 may determine a sidelink release channel resource allocation based on a periodicity of the sidelink release channel 430. For example, the UE 115 may determine that the sidelink release channel 430 spans all of the resource blocks in a frequency domain of at least one symbol allocated to the sidelink release channel 430 based on the periodicity of the sidelink release channel. In some cases, the sidelink release channel resource allocation may be preconfigured based on the periodicity of the sidelink feedback channel 425 and the periodicity of the sidelink release channel 430. For example, if the periodicity of the sidelink feedback channel 425 and the periodicity of the sidelink feedback channel 425 are greater than one, the sidelink release channel resource allocation may be preconfigured to span all of the resource blocks in the frequency domain of all of the symbols allocated to the sidelink release channel 430.

The UE 115 may determine a set of sidelink release channel resources to transmit a release message based on an SCI message transmitted by the UE 115 to reserve sidelink resources for a sidelink communication between the UE 115 and a second UE 115. For example, the UE 115 may determine a beginning subchannel of a sidelink data channel in a slot that is associated with the SCI message. In some cases, the slot may include the sidelink data channel, a sidelink control channel on which the UE 115 transmitted the SCI message, and a sidelink feedback channel. The UE 115 may map the SCI message to the release message based on determining the beginning subchannel of the sidelink data channel. For example, the UE 115 may determine a subset of resource blocks allocated to the sidelink release channel 430 to transmit the release message based on determining the beginning subchannel of the sidelink data channel and the slot of the sidelink data channel. In some examples, the mapping of the SCI message to the release message may be based on determining the beginning subchannel of the sidelink data channel and the slot of the sidelink data channel may be preconfigured.

The UE 115 may map the set of sidelink release channel resources based on a sidelink feedback channel associated the SCI message. For example, the UE 115 may receive a positive feedback message on a sidelink feedback channel 425. The sidelink feedback channel 425 may be a sidelink feedback channel 425 associated with the sidelink communication. In response to receiving the positive feedback message, the UE 115 may map the set of sidelink release channel resources to a next slot in time that includes a sidelink release channel 430. The UE 115 may map the set of sidelink release channel resources based on one or more subchannels of a sidelink data channel associated with the SCI message. For example, the UE 115 may transmit the SCI message to reserve sidelink resources for a sidelink communication with a second UE 115. In some examples, the reserved sidelink resources may include one or more subchannels of a sidelink data channel used to carry the sidelink communication. The UE 115 may map the set of sidelink release channel resources to a subset of resource blocks within one or more subchannels of sidelink data channel used to carry the sidelink communication, where the subset of resource blocks corresponds to a set of resource blocks configured for the sidelink release channel.

The UE 115 may determine that one or more resource blocks of a sidelink release channel 430 are orthogonal to one or more resource blocks of a sidelink feedback channel. For example, if both a sidelink release channel 430 and a sidelink feedback channel 425 are included in a same slot, the UE 115 may determine that the resource blocks included in the sidelink release channel 430 are orthogonal to the resource blocks included in the sidelink feedback channel 425. In some cases, the UE 115 may determine that the resource blocks of the sidelink release channel 430 are orthogonal to the resource blocks of the sidelink feedback channel 425 based on a preconfiguration of the resource blocks of the sidelink release channel 430 and the resource blocks of the sidelink feedback channel 425. For example, the UE 115 may receive an indication of the orthogonality in a sidelink release channel parameter (e.g., a sl-PSRCH-RB-Set parameter).

Figure 4A:
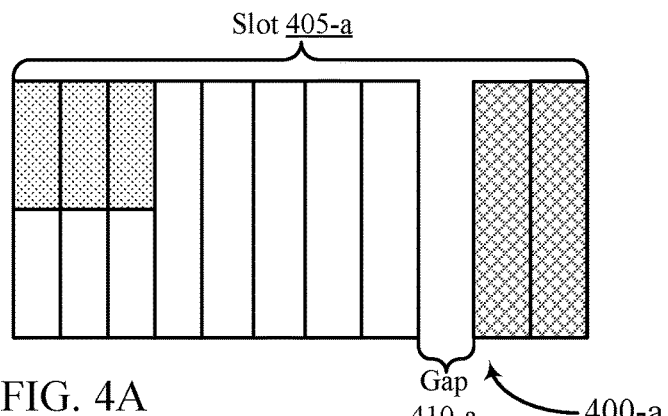
FIGS. 4A through 4D illustrates examples of resource mapping schemes that support techniques for releasing sidelink resources related to sidelink communications in accordance with one or more aspects of the present disclosure.

The resource mapping scheme 400-a depicted in FIG. 4A may illustrate a mapping of sidelink channels and sidelink resources in a slot 405-a in which a periodicity of a sidelink feedback channel 425 and a periodicity of a sidelink release channel 430 are greater than one. For example, one or more sidelink feedback channel resources may be preconfigured for every N slots (e.g., every slot, two slots, four slots, or any number of slots) and one or more sidelink release channel resources may be preconfigured for every M slots (e.g., every slot, two slots, four slots, or any number of slots). In some cases, the periodicity of the one or more sidelink feedback channel resources may be related to the periodicity of the one or more sidelink release channel resources. For example, if the one or more sidelink feedback channel resources are preconfigured for every two slots, the one or more sidelink release channel resources may be preconfigured for every two slots, and so on. In the example of the resource mapping scheme 400-a, the slot 405-a includes sidelink resources allocated for a sidelink data channel 415, a sidelink control channel 420, and a sidelink release channel 430, but not a sidelink feedback channel 425. Additionally, because the slot 405-a does include a sidelink feedback channel 425, the sidelink release channel 430 may span all of the resource blocks in the frequency domain of all the symbols allocated to the sidelink release channel 430.

Figure 4B:
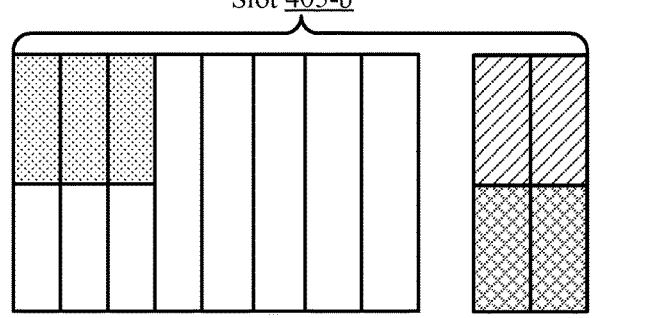

The resource mapping scheme 400-b depicted in FIG. 4B may illustrate a mapping of sidelink channels and sidelink resources in a slot 405-b in which a periodicity of a sidelink feedback channel 425 and a periodicity of a sidelink release channel 430 are one. That is, at least some sidelink resources are allocated to both the sidelink feedback channel 425 and the sidelink release channel 430 in every slot. In the example of the resource mapping scheme 400-b, the slot 405-b includes sidelink resources allocated for a sidelink data channel 415, a sidelink control channel 420, sidelink feedback channel 425, and a sidelink release channel 430. In some examples, both the sidelink feedback channel 425 and the sidelink release channel 430 may span all of the symbols allocated to the sidelink feedback channel 425 and the sidelink release channel 430. Here, the sidelink feedback channel may span a subset of the resource blocks of the slot 405-b and the sidelink release channel 430 may span a subset of the resource blocks of the slot 405-b.

Figure 4C:
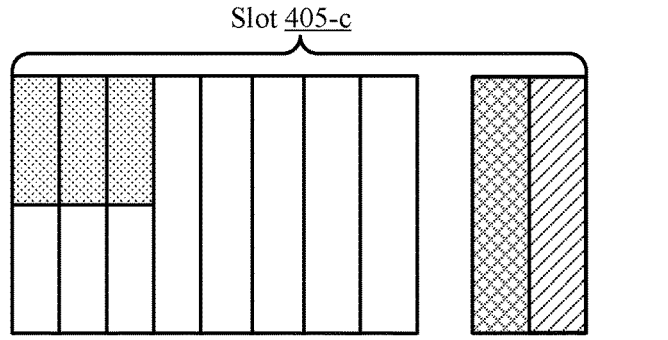

The resource mapping scheme 400-c depicted in FIG. 4C may illustrate a mapping of sidelink channels and sidelink resources in a slot 405-c in which a periodicity of a sidelink feedback channel 425 and a periodicity of a sidelink release channel 430 are one. That is, at least some sidelink resources are allocated to both the sidelink feedback channel 425 and the sidelink release channel 430 in every slot. In the example of the resource mapping scheme 400-c, the slot 405-c includes sidelink resources allocated for a sidelink data channel 415, a sidelink control channel 420, sidelink feedback channel 425, and a sidelink release channel 430. In some examples, the sidelink feedback channel 425 and the sidelink release channel 430 may each span one symbol in the time domain and all the resource blocks of the slot 405-c.

Figure 4D:
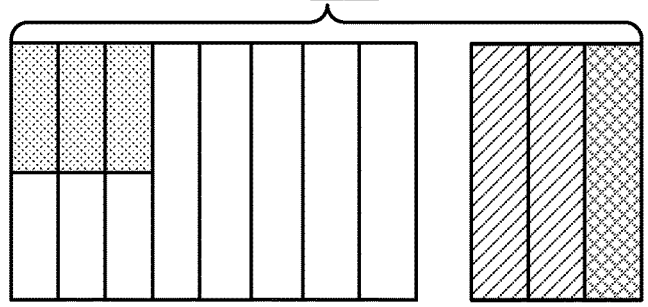

The resource mapping scheme 400-d depicted in FIG. 4D may illustrate a mapping of sidelink channels and sidelink resources in a slot 405-d in which a periodicity of a sidelink feedback channel 425 and a periodicity of a sidelink release channel 430 are one. That is, at least some sidelink resources are allocated to both the sidelink feedback channel 425 and the sidelink release channel 430 in every slot. In the example of the resource mapping scheme 400-d, the slot 405-d includes sidelink resources allocated for a sidelink data channel 415, a sidelink control channel 420, sidelink feedback channel 425, and a sidelink release channel 430. In some examples, the sidelink feedback channel 425 may span two symbols in the time domain and the sidelink release channel 430 may span one symbol in the time domain. Here, both the sidelink feedback channel 425 and the sidelink release channel 430 may span all the resource blocks of the slot 405-d.

Figure 5A:
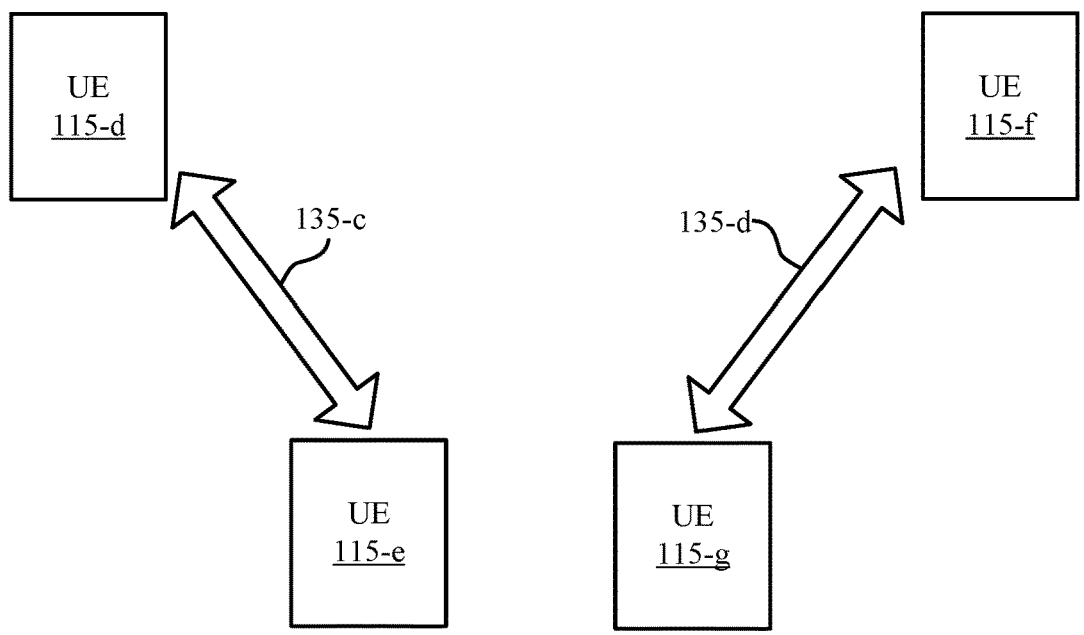
FIG. 5A illustrates an example of a wireless communications system that supports techniques for releasing sidelink resources related to sidelink communications in accordance with one or more aspects of the present disclosure.

FIG. 5A illustrates an example of a wireless communications system 500 that supports techniques for releasing sidelink resources related to sidelink communications in accordance with one or more aspects of the present disclosure. In some examples, the wireless communications system 500 may implement aspects of the wireless communications system 100 and 200 as described with reference to FIGS. 1 and 2, respectively. For example, the wireless communications system 500 may include a UE 115-d, a UE 115-e, a UE 115-f, and a UE 115-g, which may be examples of a UE 115 as described with reference to FIGS. 1 and 2. The UE 115-a and the UE 115-b may communicate with one another via communication link 135-c, and the UE 115-f and the UE 115-g may communicate with one another via communication link 135-d. The communication link 135-c and the communication link 135-d may be examples of a communication link 135 as described with reference to FIGS. 1 and 2. The wireless communications system 500 may support multiple radio access technologies including 4G systems such as LTE systems, LTE-A systems, or LTE-A Pro systems, and 5G systems, which may be referred to as NR systems.

In some examples, the UE 115-d and the UE 115-f may use a common slot and subchannel to communicate with the UE 115-e and the UE 115-g, respectively. In some examples, using a common slot and subchannel to communicate with the UE 115-e and the UE 115-g may result in the UE 115-d and the UE 115-f determining a common subset of resource blocks of a sidelink release channel to use to transmit a release message. Therefore, it may be desirable to further determine a unique subset of resource blocks of the common subset of resource blocks of the sidelink release channel for both the UE 115-d and the UE 115-f Techniques described below with reference to FIG. 5B may provide for determining the unique subset of resource blocks of the common subset of resource blocks.

Figure 5B:
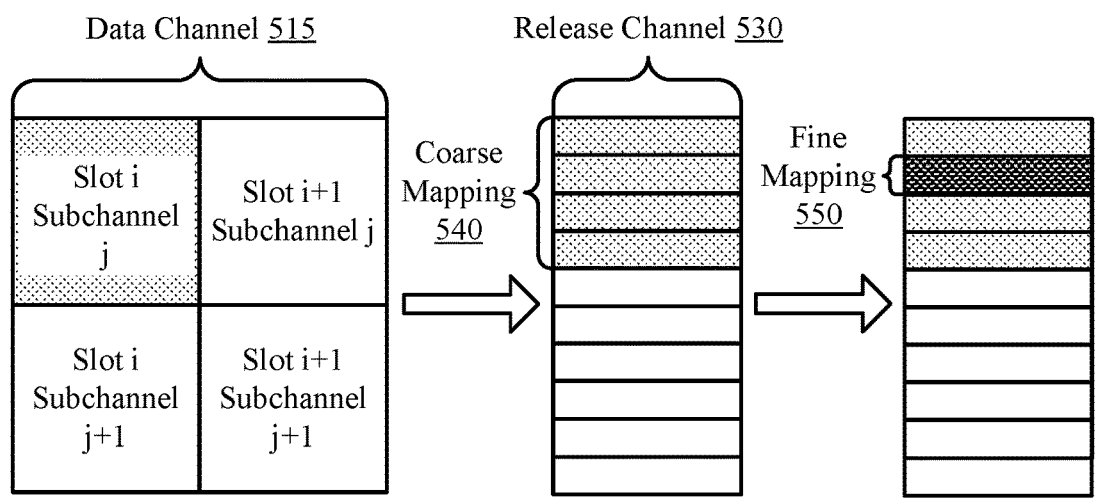
FIG. 5B illustrates an example of a resource mapping scheme that supports techniques for releasing sidelink resources related to sidelink communications in accordance with one or more aspects of the present disclosure.

FIG. 5B illustrates an example of a resource mapping scheme 505 that supports techniques for releasing sidelink resources related to sidelink communications in accordance with one or more aspects of the present disclosure. In some examples, the resource mapping scheme 505 may implement aspects of the wireless communications system 100, 200, and 500 as described with reference to FIGS. 1, 2 and 5A, respectively. For example, the resource mapping scheme 505 may be implemented by a UE 115, which may be an example of a UE 115 as described with reference to FIGS. 1 and 2. The resource mapping schemes 505 may be implemented by the UE 115 to release sidelink resources and to signal the release of the sidelink resources to other UEs 115 to improve efficiency and resource usage for sidelink communications and promote highly reliable communications.

The resource mapping scheme 505 illustrates a mapping between a sidelink data channel 515 and a sidelink release channel 530. For example, the sidelink data channel 515 illustrates sidelink data channel transmissions in multiple slots and subchannels, and the sidelink release channel illustrates multiple subchannels included in the sidelink release channel. In some examples, a first UE 115 may transmit an SCI message to reserve sidelink resources (e.g., slot i, subchannel j) to transmit sidelink data to a second UE 115. In the example of the resource mapping scheme 505, the first UE 115 may transmit the sidelink data to the second UE 115 in slot i, subchannel j. The first UE 115 may receive a positive feedback message from the second UE 115 in response to receiving the sidelink data and may release any remaining sidelink resources based on receiving the positive feedback message.

As described with reference to FIGS. 4A through 4D, the first UE 115 may determine a set of sidelink release channel resources to transmit a release message that indicates the released sidelink resources. For example, the first UE 115 may determine a coarse mapping 540 of the SCI message and the sidelink resources used to transmit the sidelink data to the set of sidelink release channel resources. For example, the first UE 115 may determine a beginning subchannel j and a slot i of the sidelink data channel 515 used to transmit the sidelink data. Based on determining the subchannel j and the slot i, the first UE may determine a subset of resource blocks of the sidelink release channel 530 in which to transmit the release message.

The first UE 115 may further determine a fine mapping 550 determine the set of sidelink release channel resources to transmit the release message. For example, the first UE 115 may determine one or more information bits associated with the SCI message. Based on determining the one or more information bits, the first UE 115 may determine a subset of the subset of resource blocks determine according to the coarse mapping 540 to use to transmit the release message. The first UE 115 may map the SCI message to subset of the subset of resource blocks based on the one or more information bits associated with the SCI message. In some cases, the first UE 115 may map the SCI message to the subset of the subset of resource blocks based on a modulo operation on a cyclic redundancy check bit of the SCI message.

In some examples, the first UE 115 may determine a common subset of resource blocks associated with sidelink resource channel. The common subset of resource blocks may be common to more than one UE 115 that is attempting to transmit a release message. Based on determining the common subset of resource blocks, the first UE 115 may map the SCI message to the release message according to the fine mapping 550. The described techniques may, as a result, include features for avoiding interference or collision when transmitting release messages. Additionally, the described techniques may, as a result, includes features for higher efficiency and coordination between UEs 115 for resource usage in sidelink communications.

Figure 6:
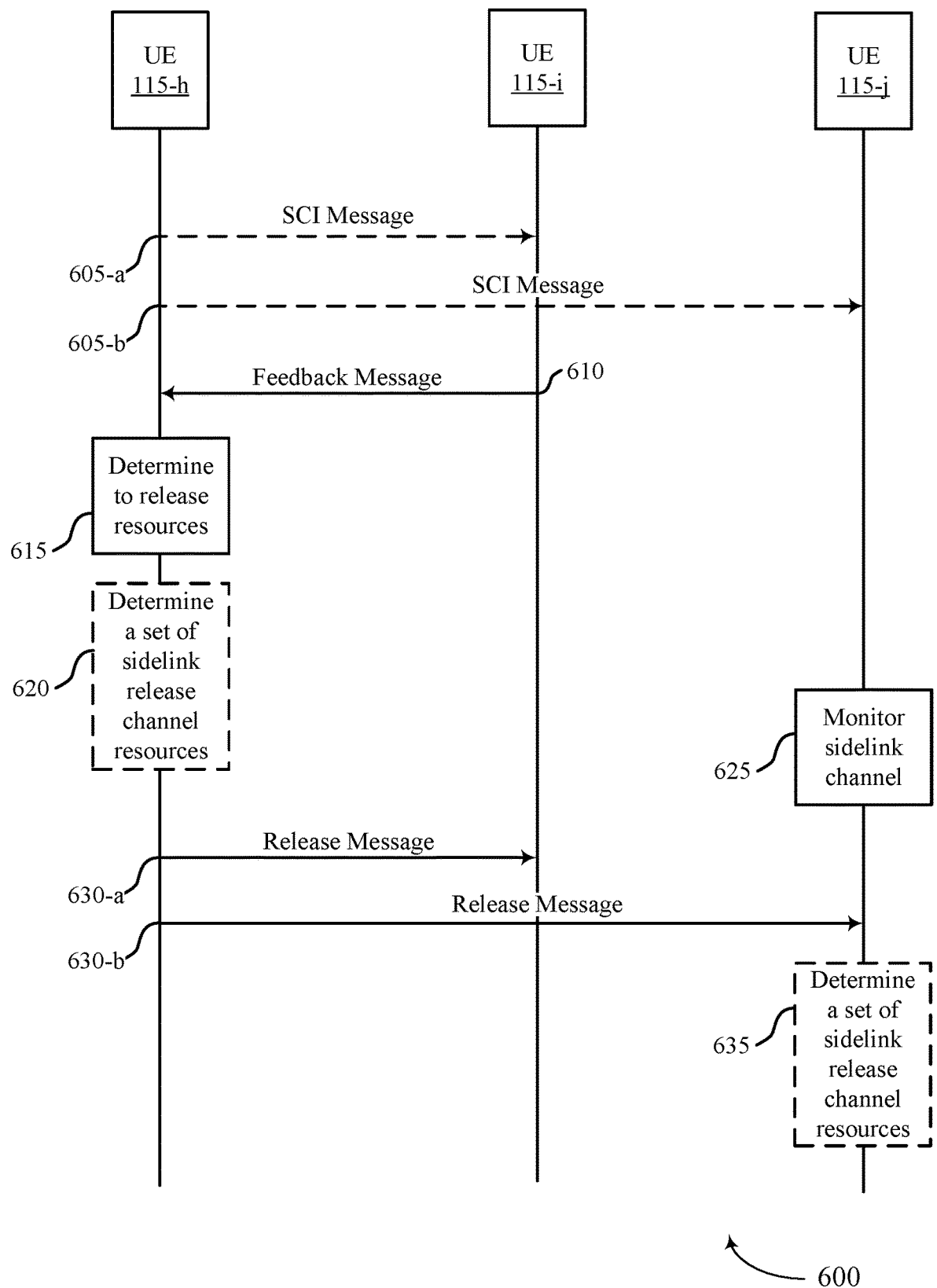
FIG. 6 illustrates an example of a process flow that supports techniques for releasing sidelink resources related to sidelink communications in accordance with one or more aspects of the present disclosure.

FIG. 6 illustrates an example of a process flow 600 that supports techniques for releasing sidelink resources related to sidelink communications in accordance with one or more aspects of the present disclosure. The process flow 600 may implement aspects of the wireless communications systems 100 and 200 described with reference to FIGS. 1 and 2, respectively. The process flow 600 may be implemented by a UE 115-*h*, a UE 115-*i*, and a UE 115-*j*, which may be examples of a UE 115 as described with reference to FIGS. 1 through 5. The process flow 600 may be implemented by the UE 115-*h*, the UE 115-*i*, and the UE 115-*j* to release sidelink resources and to signal the release of the sidelink resources to other UEs 115 to improve efficiency and resource usage for sidelink communications and promote highly reliable communications. In the following description of the process flow 600, the operations between the UE 115-*h*, the UE 115-*i*, and the UE 115-*j* may be transmitted in a different order than the example order shown, or the operations performed by the UE 115-*h*, the UE 115-*i*, and the UE 115-*j* may be performed in different orders or at different times. Some operations may also be omitted from the process flow 600, and other operations may be added to the process flow 600.

At 605-*a*, the UE 115-*h* may transmit an SCI message (e.g., an SCI-1 message) on a sidelink control channel (e.g., a PSCCH) to the second UE 115-*i*. Similarly, at 605-*b*, the UE 115-*h* may transmit the SCI message on the sidelink control channel to the UE 115-*j*. The SCI message may reserve a set of sidelink resources for a sidelink communication between the UE 115-*h* and the UE 115-*i*. In some examples, the SCI message may reserve the set of sidelink resources for one or more slots. The UE 115-*h* may then transmit the sidelink communication using the reserved set of sidelink resources. At 610, the UE 115-*i* may transmit a feedback message to the UE 115-*h*. In some examples, the feedback message may be a positive feedback message (e.g., an ACK message). For example, if the UE 115-*i* successfully receives the sidelink communication from the UE 115-*h*, the UE 115-*i* may transmit the ACK message to the UE 115-*h*. At 615, the UE 115-*h* may determine to release the set of sidelink resources based on receiving the ACK message. For example, the UE 115-*h* may determine that the UE 115-*i* successfully received the sidelink communication based on receiving the ACK message. The UE 115-*h* may thus choose to not retransmit the sidelink communication and instead release the set of sidelink resources.

At 620, the UE 115-*h* may determine a set of sidelink release channel resources based on transmitting the SCI message. The UE 115-*h* may determine to transmit a release message (e.g., a PSRCH message) using the determined set of sidelink release channel resources. At 625, the UE 115-*j* may monitor a sidelink channel. For example, based on receiving the SCI message at 605-*b*, the UE 115-*j* may monitor a sidelink release channel (e.g., PSRCH) for the release message. At 630-*a*, the UE 115-*h* may transmit the release message on the sidelink release channel to the UE 115-*i* that includes an indication of the released set of sidelink resources. Similarly, at 630-*b*, the UE 115-*h* may transmit the release message on the sidelink release channel to the UE 115-*j*. At 635, the UE 115-*j* may determine a set of sidelink release channel resources based on the SCI message received, at 605-*b*. The UE 115-*j* may use the determined set of sidelink release channel resources to receive the release message on the sidelink release channel transmitted, at 630-*b*.

Figure 7:
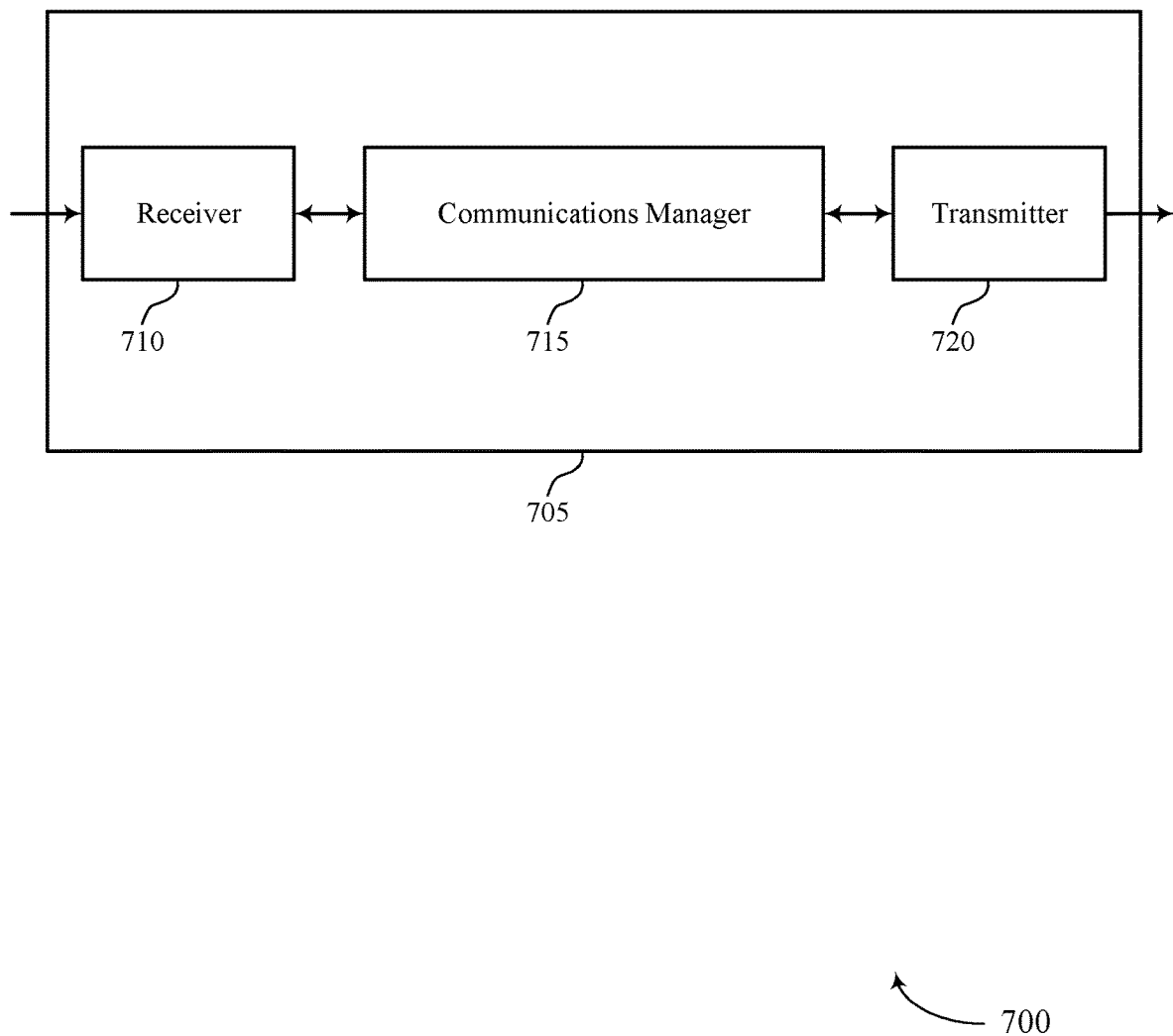
FIGS. 7 and 8 show block diagrams of devices that support techniques for releasing sidelink resources related to sidelink communications in accordance with one or more aspects of the present disclosure.

FIG. 7 shows a block diagram 700 of a device 705 that supports techniques for releasing sidelink resources related to sidelink communications in accordance with one or more aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for releasing sidelink resources related to sidelink communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may transmit an SCI message on a PSCCH to a group of devices. The SCI message may reserve a set of sidelink resources for the sidelink communication between the device 705 and a second device of the group of devices. The communications manager 715 may release the set of sidelink resources based on receiving, from the second device, an ACK message on a PSFCH, and transmit a PSRCH message on a PSRCH. The PSRCH message may include an indication of the released set of sidelink resources. The communications manager 715 may also monitor a sidelink channel and receive a PSRCH message on a PSRCH from a second device. The PSRCH message may include an indication that a set of sidelink resources reserved for sidelink communications between the second device and a third device are released. The communications manager 715 may be an example of aspects of the communications manager 1010 described herein.

The communications manager 715 may be implemented as an integrated circuit or chipset for the device 705, and the receiver 710 and the transmitter 720 may be implemented as analog components (for example, amplifiers, filters, antennas) coupled with the device 705 modem to enable wireless transmission and reception The actions performed by the communications manager 715 as described herein may increase efficiency and resource usage for sidelink communications. At least one implementation may enable the communications manager 715 to release a set of reserved sidelink resources by transmitting a PSRCH message to a group of devices. Based on implementing the releasing, one or more processors of the device 705 (for example, processor(s) controlling or incorporated with the communications manager 715) may promote higher efficiency and resource usage for sidelink communications and, in some examples, may promote spectral efficiency, higher data rates, and enhanced efficiency for high reliability and low latency operations by releasing sidelink resources that would otherwise go unused.

The communications manager 715 may be an example of means for performing various aspects of releasing sidelink resources related to sidelink communications as described herein. The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In another implementation, the communications manager 715, or its sub-components, may be implemented in code (e.g., as communications management software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device. In some examples, the communications manager 715 may be configured to perform various operations (e.g., transmitting, releasing) using or otherwise in cooperation with the receiver 710, the transmitter 720, or both.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
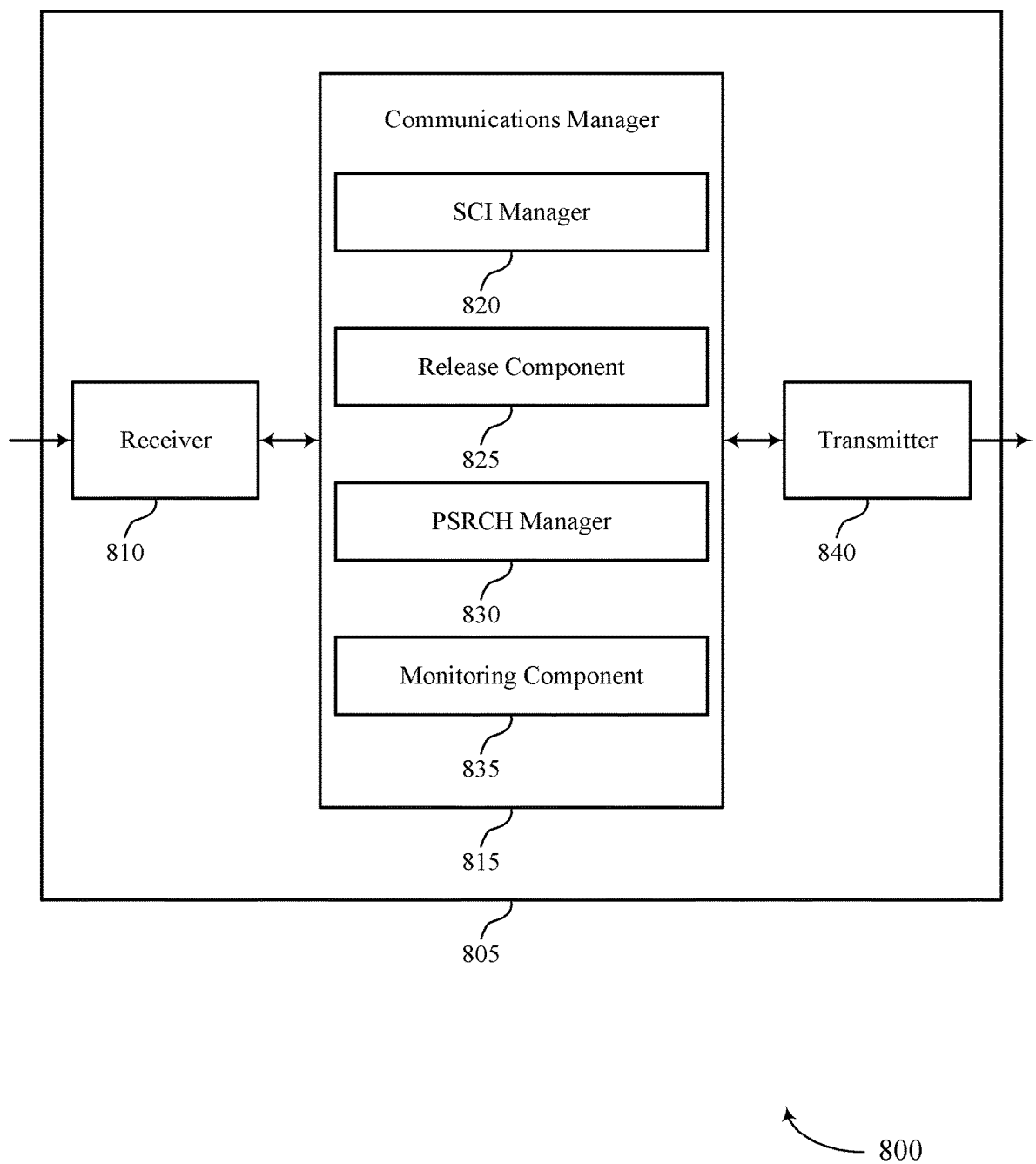

FIG. 8 shows a block diagram 800 of a device 805 that supports techniques for releasing sidelink resources related to sidelink communications in accordance with one or more aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to techniques for releasing sidelink resources related to sidelink communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an SCI manager 820, a release component 825, a PSRCH manager 830, and a monitoring component 835. The communications manager 815 may be an example of aspects of the communications manager 1010 described herein.

The SCI manager 820 may transmit an SCI message on a PSCCH to a group of devices, the SCI message reserving a set of sidelink resources for the sidelink communication between the device 805 and a second device of the group of devices. The release component 825 may release the set of sidelink resources based on receiving, from the second device, an ACK message on a PSFCH. The PSRCH manager 830 may transmit a PSRCH message on a PSRCH. The PSRCH message may include an indication of the released set of sidelink resources. The monitoring component 835 may monitor a sidelink channel. The PSRCH manager 830 may receive a PSRCH message on a PSRCH from a second device, the PSRCH message including an indication that a set of sidelink resources reserved for sidelink communications between the second device and a third device are released.

The transmitter 840 may transmit signals generated by other components of the device 805. In some examples, the transmitter 840 may be collocated with a receiver 810 in a transceiver component. For example, the transmitter 840 may be an example of aspects of the transceiver 1020 described with reference to FIG. 10. The transmitter 840 may utilize a single antenna or a set of antennas.

Figure 9:
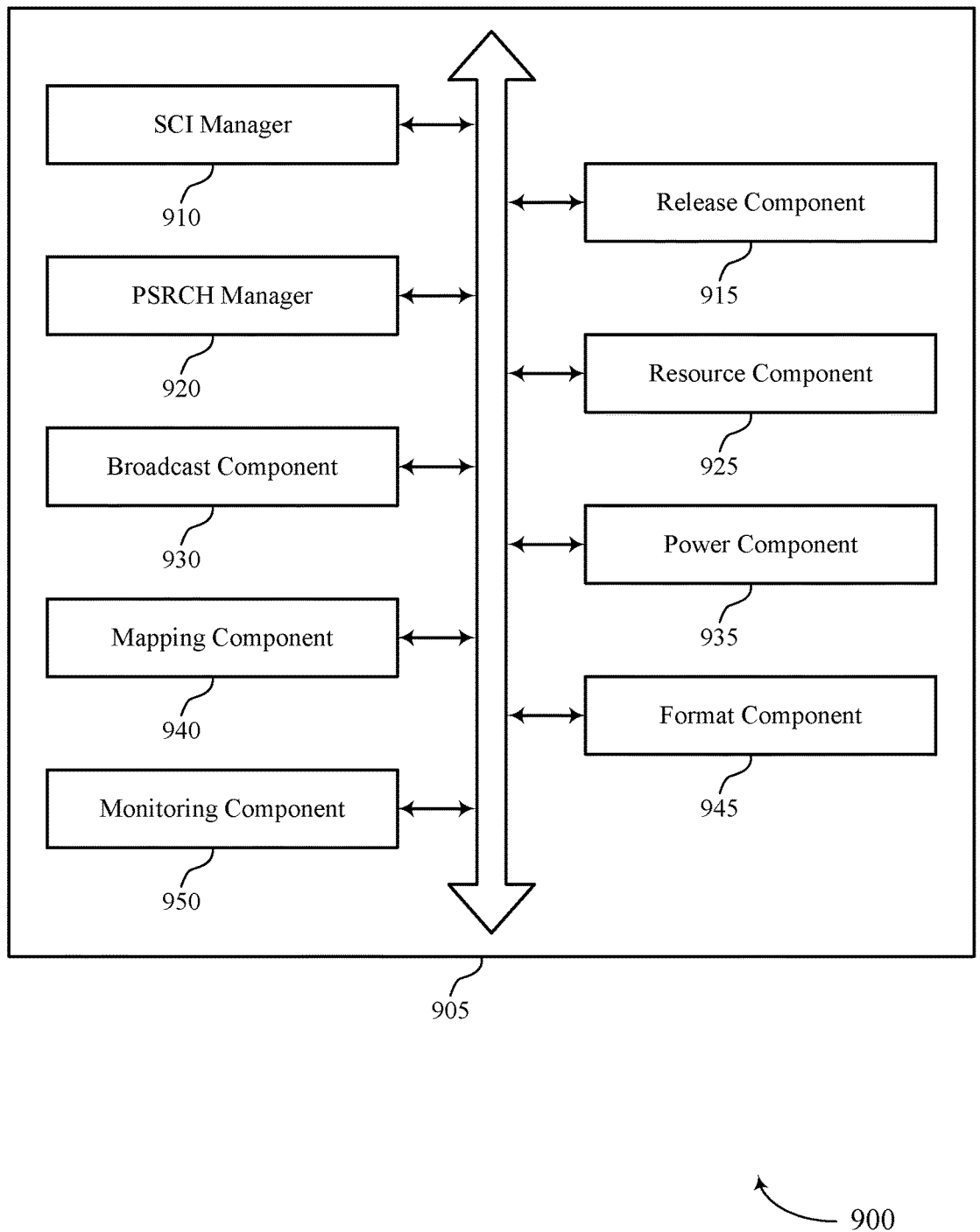
FIG. 9 shows a block diagram of a communications manager that supports techniques for releasing sidelink resources related to sidelink communications in accordance with one or more aspects of the present disclosure.

FIG. 9 shows a block diagram 900 of a communications manager 905 that supports techniques for releasing sidelink resources related to sidelink communications in accordance with one or more aspects of the present disclosure. The communications manager 905 may be an example of aspects of a communications manager 715, a communications manager 815, or a communications manager 1010 described herein. The communications manager 905 may include an SCI manager 910, a release component 915, a PSRCH manager 920, a resource component 925, a broadcast component 930, a power component 935, a mapping component 940, a format component 945, and a monitoring component 950. Each of these components may communicate, directly or indirectly, with one another (e.g., via one or more buses).

The SCI manager 910 may receive an ACK message on a PSFCH. The ACK message may acknowledge the sidelink communication on a first subset of sidelink resources of a set of sidelink resources. In some examples, the SCI manager 910 may transmit a PSRCH message on a PSRCH based on the ACK message. In some examples, the SCI manager 910 may transmit an SCI message on a PSCCH to a group of devices. The SCI message may reserve the set of sidelink resources for the sidelink communication.

In some cases, the PSRCH manager 920 may transmit, in response to receiving the ACK message on the PSFCH, the PSRCH message on the PSRCH. The PSRCH message may include an indication of releasing a second subset of sidelink resources of the set of sidelink resources. In some implementations, the PSRCH manager 920 may transmit the PSRCH message based on a format associated with the PSRCH message that includes a cyclic-shift of a sequence.

The monitoring component 950 may monitor a PSRCH. In some examples, the monitoring component 950 may monitor the sidelink channel for the PSRCH message based on receiving the SCI message on the PSCCH. The resource component 925 may determine, in response to transmitting the SCI message on the PSCCH, a set of PSRCH resources. In some examples, the resource component 925 may transmit the PSRCH message on the PSRCH using the set of PSRCH resources. In some examples, the resource component 925 may determine that one or more PSRCH resources associated with the PSRCH are periodic or preconfigured, or both. In some cases, a periodicity of the one or more PSRCH resources associated with the PSRCH relates to a periodicity of one or more PSFCH resources associated with the PSFCH.

The resource component 925 may determine that the PSRCH spans over all physical resource blocks of at least one symbol in a slot. In some implementations, the resource component 925 may determine the PSRCH spans over a subset of physical resource blocks of at least one symbol in a slot associated with the PSFCH. In some examples, the resource component 925 may determine a physical resource block set associated with the PSRCH is orthogonal to a physical resource block set associated with the PSFCH in a slot. In some cases, the resource component 925 may determine, in response to receiving the SCI message on the PSCCH, a set of PSRCH resources. In some examples, the resource component 925 may receive the PSRCH message on the PSRCH using the set of PSRCH resources.

The broadcast component 930 may broadcast, to the group of devices, the PSRCH message on the PSRCH. In some examples, the broadcast component 930 may broadcast, to the group of devices, the PSRCH message on the PSRCH using the determined power level. The power component 935 may determine a power level to broadcast the PSRCH message on the PSRCH based on transmitting the SCI message on the PSCCH. The mapping component 940 may determine a slot and a subset of physical resource blocks in the slot to transmit the PSRCH. In some examples, the mapping component 940 may map the SCI message to the slot based on the slot including the SCI message or the slot including the PSFCH, or both. In some cases, the mapping component 940 may map the SCI message to the subset of physical resource blocks in the slot based on a beginning subchannel of the SCI message.

The mapping component 940 may determine one or more information bits associated with the SCI message. In some cases, the mapping component 940 may map the SCI message to the PSRCH message based on the determined one or more information bits associated with the SCI message. In some examples, the mapping component 940 may determine, in a slot, a subset of physical resource blocks associated with transmitting the PSRCH message. In some cases, the mapping component 940 may map the SCI message to the PSRCH message based on the subset of physical resource blocks in the slot. The mapping component 940 may map one or more PSRCH resources to a slot associated with the PSRCH following a previous slot associated with the PSFCH related to the SCI message.

In some examples, the mapping component 940 may map one or more PSRCH resources to a subset of physical resource blocks within one or more subchannels associated with the PSSCH related to the SCI message, the subset of physical resource blocks corresponds to a set of physical resource blocks configured for the PSRCH. The mapping component 940 may determine a common subset of physical resource blocks associated with the PSRCH. In some examples, the common subset of physical resource blocks may be shared for a group of devices. In some examples, the mapping component 940 may map the SCI message to the PSRCH based on determining the common subset of physical resource blocks. In some examples, the mapping component 940 may map the SCI message to the PSRCH based on a modulo operation on a cyclic redundancy check bit of the SCI message. The format component 945 may determine a format associated with the PSRCH message, the format including a cyclic-shift of a sequence. In some cases, the sequence includes a Zadoff-Chu sequence.

Figure 10:
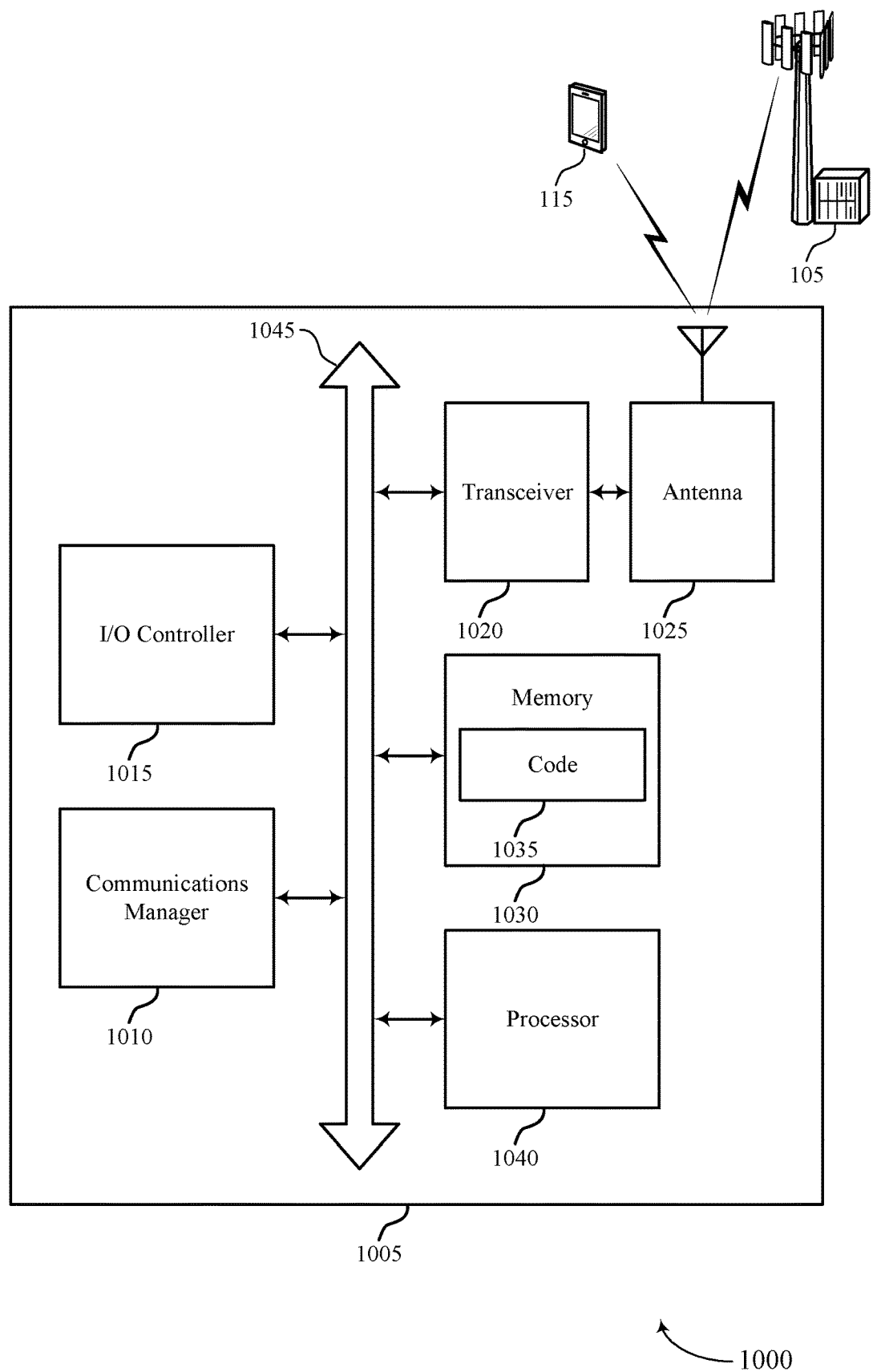
FIG. 10 shows a diagram of a system including a device that supports techniques for releasing sidelink resources related to sidelink communications in accordance with one or more aspects of the present disclosure.

FIG. 10 shows a diagram of a system 1000 including a device 1005 that supports techniques for releasing sidelink resources related to sidelink communications in accordance with one or more aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive an ACK message on a PSFCH, and transmit a PSRCH message on a PSRCH based on the ACK message. The PSRCH message may include an indication of the released set of sidelink resources. The communications manager 1010 may also monitor a PSRCH and receive a PSRCH message on the PSRCH. The PSRCH message may include an indication that a set of sidelink resources reserved for sidelink communications are released.

At least one implementation may enable to communications manager 1010 to release a set of reserved sidelink resources by transmitting a PSRCH message to a group of devices. Based on implementing the releasing, one or more processors of the device 1005 (for example, processor(s) controlling or incorporated with the communications manager 1010) may promote increased efficiency and coordination for resource usage for sidelink communications and, in some examples, may promote spectral efficiency, higher data rates, and enhanced efficiency for high reliability and low latency operations by releasing sidelink resources that would otherwise go unused.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases, the device 1005 may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor 1040 to perform various functions described herein. In some cases, the memory 1030 may contain, among other things, a basic input/output system (BIOS) which may control basic hardware or software operation such as the interaction with peripheral components or devices. The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for releasing sidelink resources related to sidelink communications).

Figure 11:
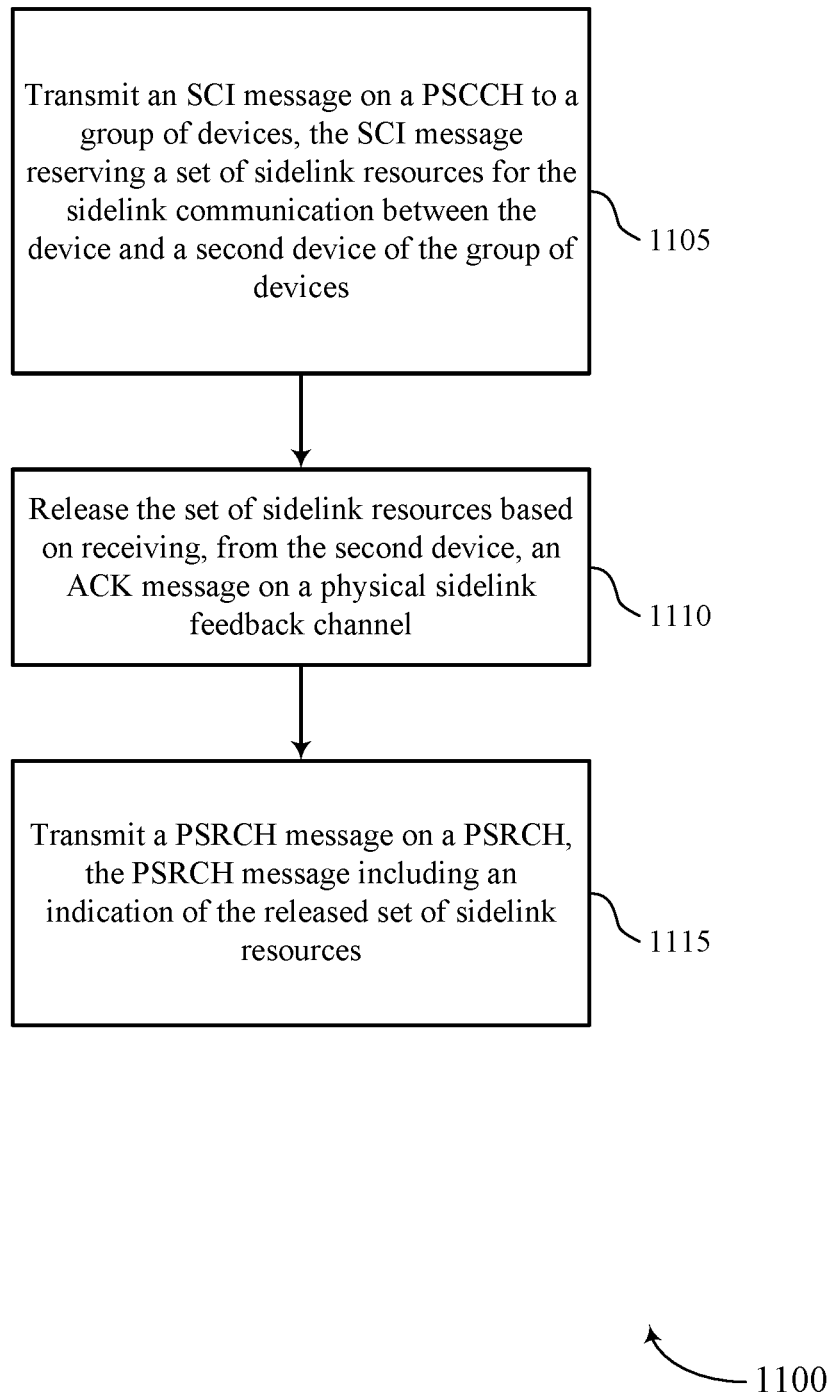
FIGS. 11 through 22 show flowcharts illustrating methods that support techniques for releasing sidelink resources related to sidelink communications in accordance with one or more aspects of the present disclosure.

FIG. 11 shows a flowchart illustrating a method 1100 that supports techniques for releasing sidelink resources related to sidelink communications in accordance with one or more aspects of the present disclosure. The operations of method 1100 may be implemented by a device (e.g., a UE 115) or its components as described herein. For example, the operations of method 1100 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1105, the device may transmit an SCI message on a PSCCH to a group of devices, the SCI message reserving a set of sidelink resources for the sidelink communication between the device and a second device of the group of devices. The operations of 1105 may be performed according to the methods described herein. In some examples, aspects of the operations of 1105 may be performed by an SCI manager as described with reference to FIGS. 7 through 10.

At 1110, the device may release the set of sidelink resources based on receiving, from the second device, an ACK message on a PSFCH. The operations of 1110 may be performed according to the methods described herein. In some examples, aspects of the operations of 1110 may be performed by a release component as described with reference to FIGS. 7 through 10.

At 1115, the device may transmit a PSRCH message on a PSRCH, the PSRCH message including an indication of the released set of sidelink resources. The operations of 1115 may be performed according to the methods described herein. In some examples, aspects of the operations of 1115 may be performed by a PSRCH manager as described with reference to FIGS. 7 through 10.

Figure 12:
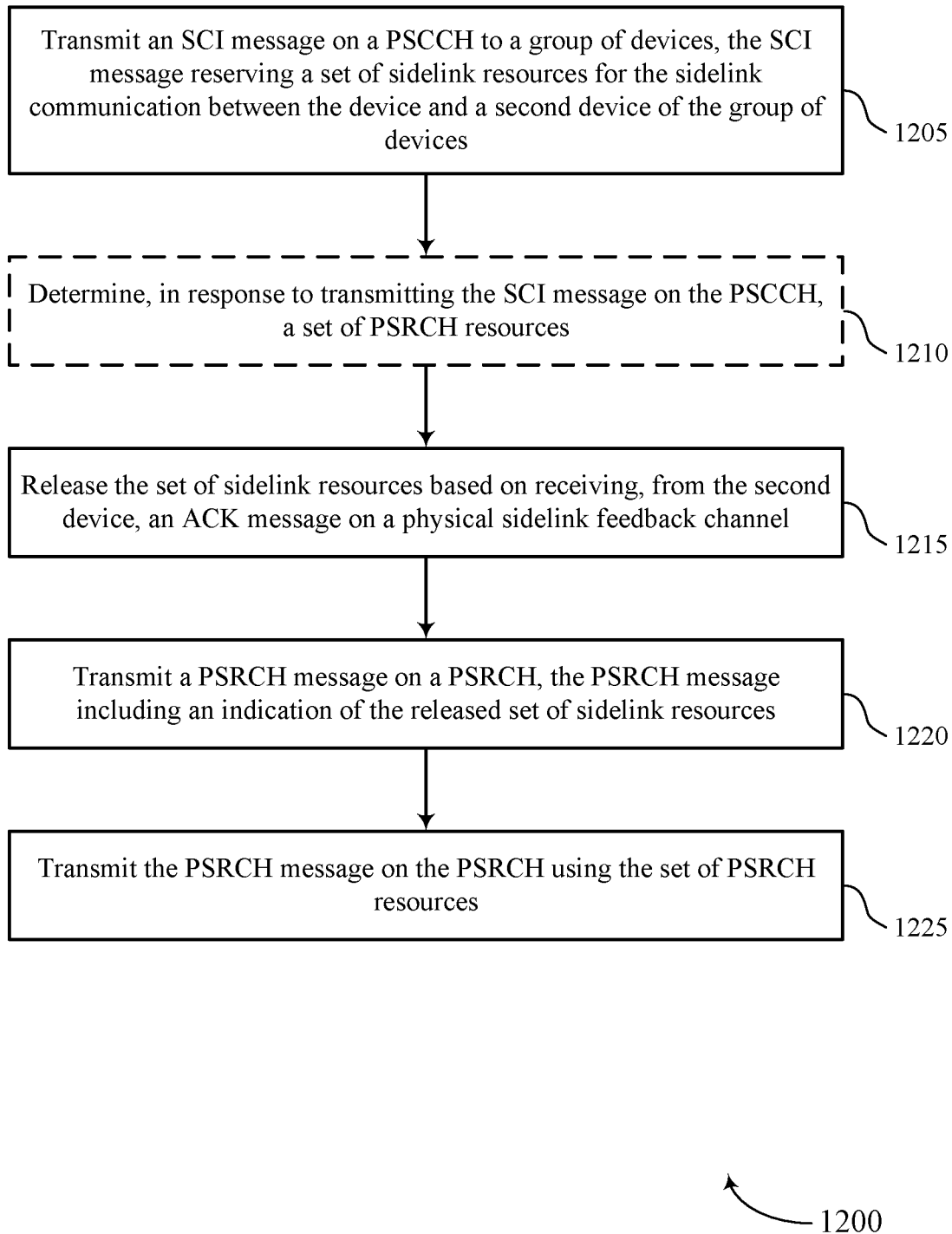

FIG. 12 shows a flowchart illustrating a method 1200 that supports techniques for releasing sidelink resources related to sidelink communications in accordance with one or more aspects of the present disclosure. The operations of method 1200 may be implemented by a device (e.g., a UE 115) or its components as described herein. For example, the operations of method 1200 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1205, the device may transmit an SCI message on a PSCCH to a group of devices, the SCI message reserving a set of sidelink resources for the sidelink communication between the device and a second device of the group of devices. The operations of 1205 may be performed according to the methods described herein. In some examples, aspects of the operations of 1205 may be performed by an SCI manager as described with reference to FIGS. 7 through 10.

At 1210, the device may determine, in response to transmitting the SCI message on the PSCCH, a set of PSRCH resources. The operations of 1210 may be performed according to the methods described herein. In some examples, aspects of the operations of 1210 may be performed by a resource component as described with reference to FIGS. 7 through 10.

At 1215, the device may release the set of sidelink resources based on receiving, from the second device, an ACK message on a PSFCH. The operations of 1215 may be performed according to the methods described herein. In some examples, aspects of the operations of 1215 may be performed by a release component as described with reference to FIGS. 7 through 10.

At 1220, the device may transmit a PSRCH message on a PSRCH, the PSRCH message including an indication of the released set of sidelink resources. The operations of 1220 may be performed according to the methods described herein. In some examples, aspects of the operations of 1220 may be performed by a PSRCH manager as described with reference to FIGS. 7 through 10.

At 1225, the device may transmit the PSRCH message on the PSRCH using the set of PSRCH resources. The operations of 1225 may be performed according to the methods described herein. In some examples, aspects of the operations of 1225 may be performed by a resource component as described with reference to FIGS. 7 through 10.

Figure 13:
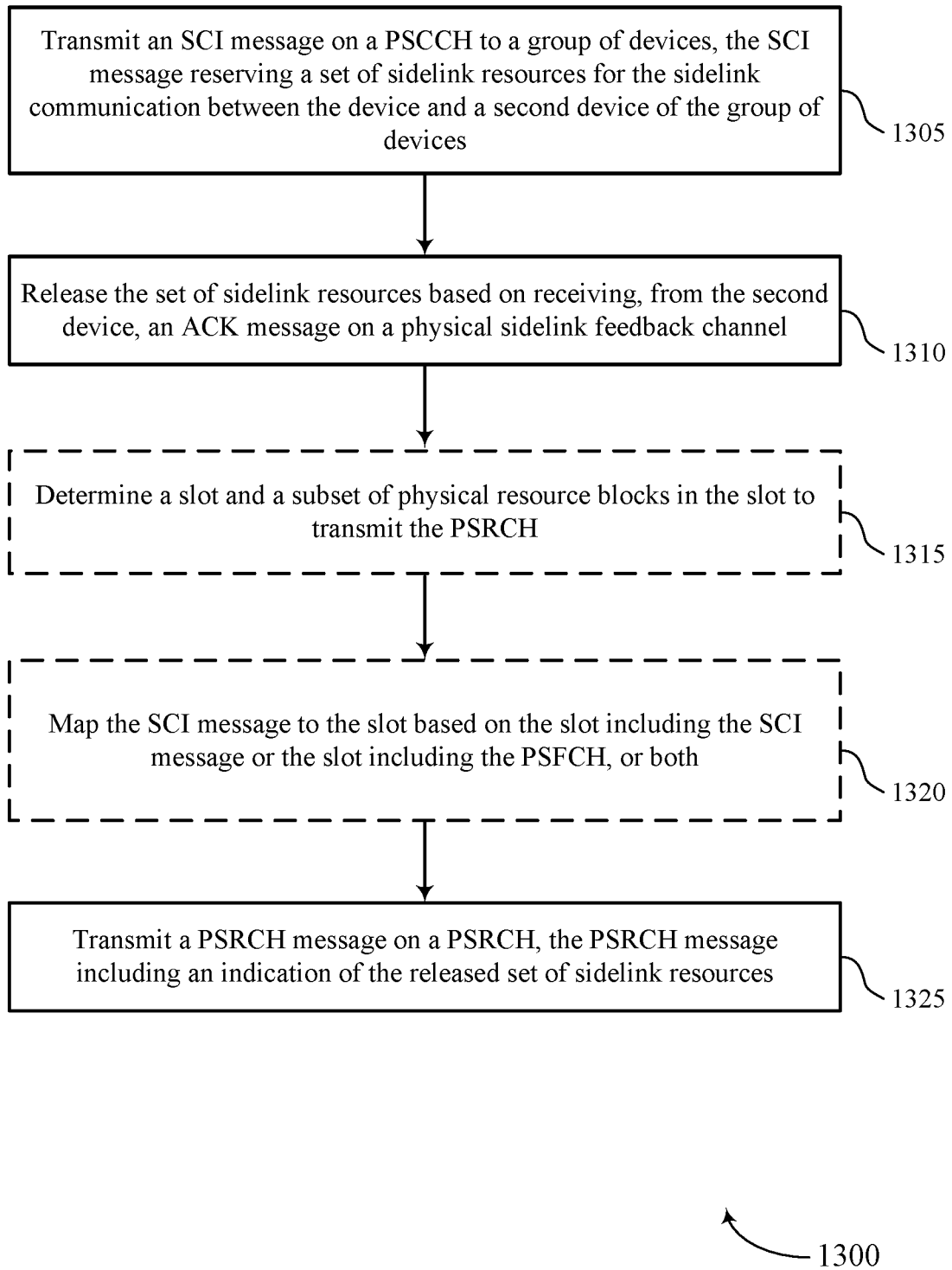

FIG. 13 shows a flowchart illustrating a method 1300 that supports techniques for releasing sidelink resources related to sidelink communications in accordance with one or more aspects of the present disclosure. The operations of method 1300 may be implemented by a device (e.g., a UE 115) or its components as described herein. For example, the operations of method 1300 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1305, the device may transmit an SCI message on a PSCCH to a group of devices, the SCI message reserving a set of sidelink resources for the sidelink communication between the device and a second device of the group of devices. The operations of 1305 may be performed according to the methods described herein. In some examples, aspects of the operations of 1305 may be performed by an SCI manager as described with reference to FIGS. 7 through 10.

At 1310, the device may release the set of sidelink resources based on receiving, from the second device, an ACK message on a PSFCH. The operations of 1310 may be performed according to the methods described herein. In some examples, aspects of the operations of 1310 may be performed by a release component as described with reference to FIGS. 7 through 10.

At 1315, the device may determine a slot and a subset of physical resource blocks in the slot to transmit the PSRCH. The operations of 1315 may be performed according to the methods described herein. In some examples, aspects of the operations of 1315 may be performed by a mapping component as described with reference to FIGS. 7 through 10.

At 1320, the device may map the SCI message to the slot based on the slot including the SCI message or the slot including the PSFCH, or both. The operations of 1320 may be performed according to the methods described herein. In some examples, aspects of the operations of 1320 may be performed by a mapping component as described with reference to FIGS. 7 through 10.

At 1325, the device may transmit a PSRCH message on a PSRCH, the PSRCH message including an indication of the released set of sidelink resources. The operations of 1325 may be performed according to the methods described herein. In some examples, aspects of the operations of 1325 may be performed by a PSRCH manager as described with reference to FIGS. 7 through 10.

Figure 14:
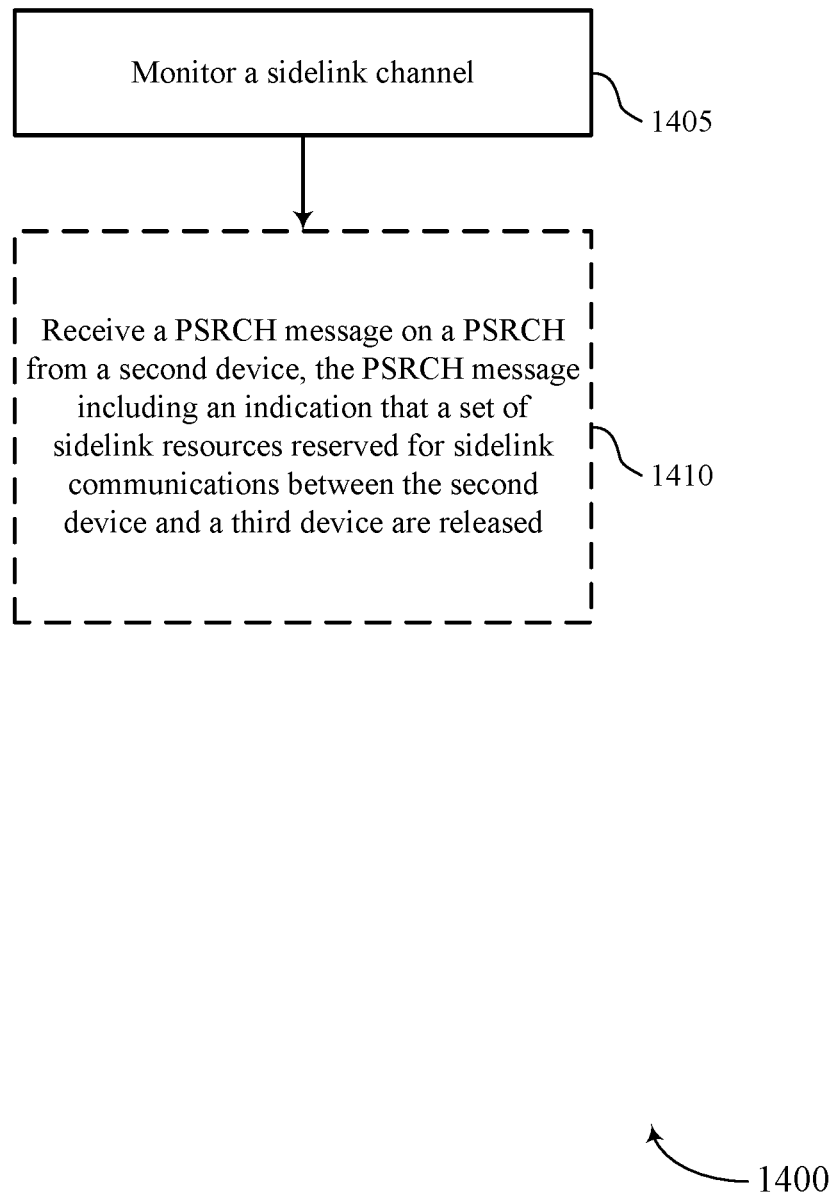

FIG. 14 shows a flowchart illustrating a method 1400 that supports techniques for releasing sidelink resources related to sidelink communications in accordance with one or more aspects of the present disclosure. The operations of method 1400 may be implemented by a device (e.g., a UE 115) or its components as described herein. For example, the operations of method 1400 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1405, the device may monitor a sidelink channel. The operations of 1405 may be performed according to the methods described herein. In some examples, aspects of the operations of 1405 may be performed by a monitoring component as described with reference to FIGS. 7 through 10.

At 1410, the device may receive a PSRCH message on a PSRCH from a second device, the PSRCH message including an indication that a set of sidelink resources reserved for sidelink communications between the second device and a third device are released. The operations of 1410 may be performed according to the methods described herein. In some examples, aspects of the operations of 1410 may be performed by a PSRCH manager as described with reference to FIGS. 7 through 10.

Figure 15:
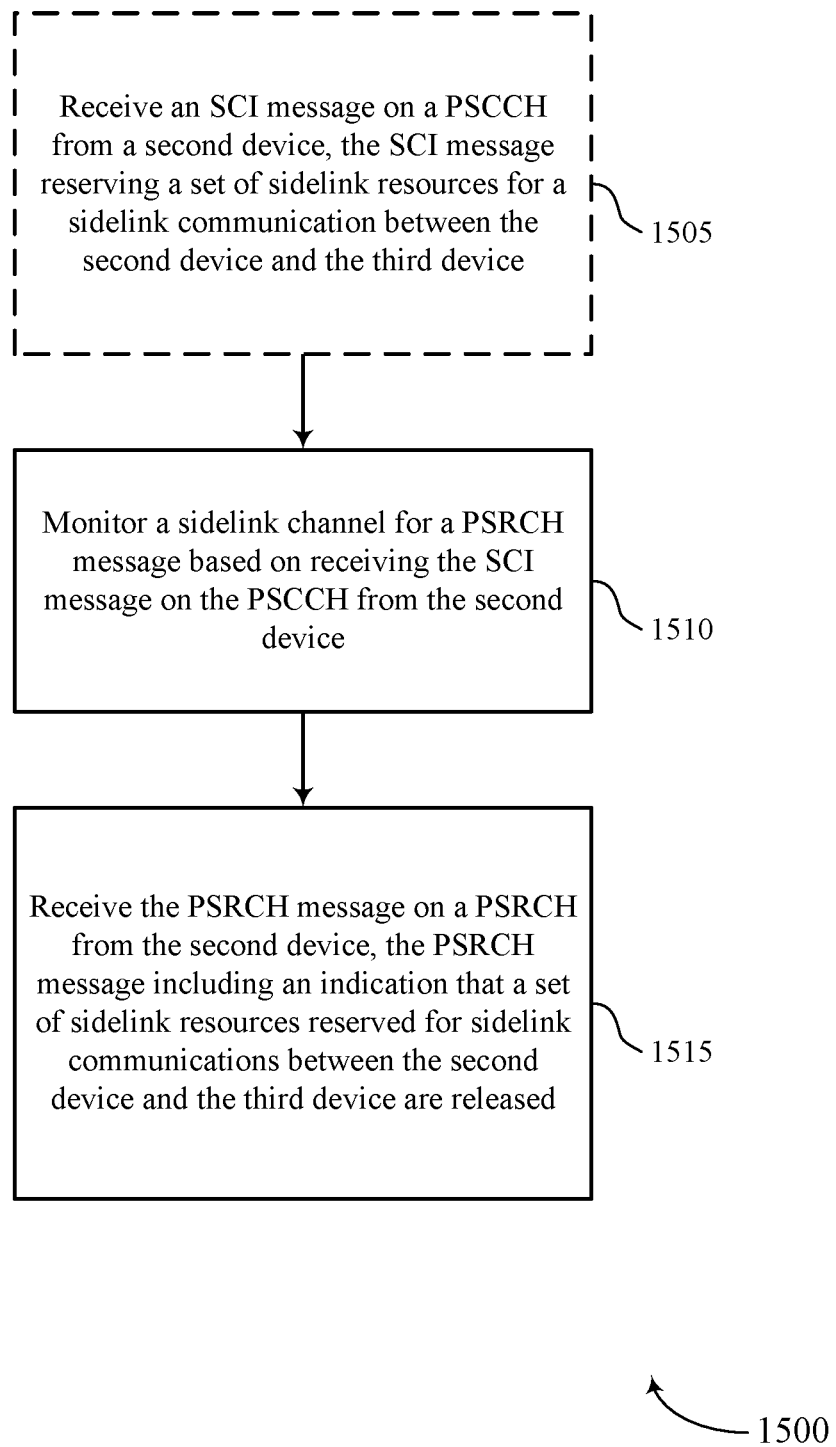

FIG. 15 shows a flowchart illustrating a method 1500 that supports techniques for releasing sidelink resources related to sidelink communications in accordance with one or more aspects of the present disclosure. The operations of method 1500 may be implemented by a device (e.g., a UE 115) or its components as described herein. For example, the operations of method 1500 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1505, the device may receive an SCI message on a PSCCH from a second device, the SCI message reserving a set of sidelink resources for a sidelink communication between the second device and the third device. The operations of 1505 may be performed according to the methods described herein. In some examples, aspects of the operations of 1505 may be performed by an SCI manager as described with reference to FIGS. 7 through 10.

At 1510, the device may monitor a sidelink channel for a PSRCH message based on receiving the SCI message on the PSCCH from the second device. The operations of 1510 may be performed according to the methods described herein. In some examples, aspects of the operations of 1510 may be performed by a monitoring component as described with reference to FIGS. 7 through 10.

At 1515, the device may receive the PSRCH message on a PSRCH from the second device, the PSRCH message including an indication that a set of sidelink resources reserved for sidelink communications between the second device and the third device are released. The operations of 1515 may be performed according to the methods described herein. In some examples, aspects of the operations of 1515 may be performed by a PSRCH manager as described with reference to FIGS. 7 through 10.

Figure 16:
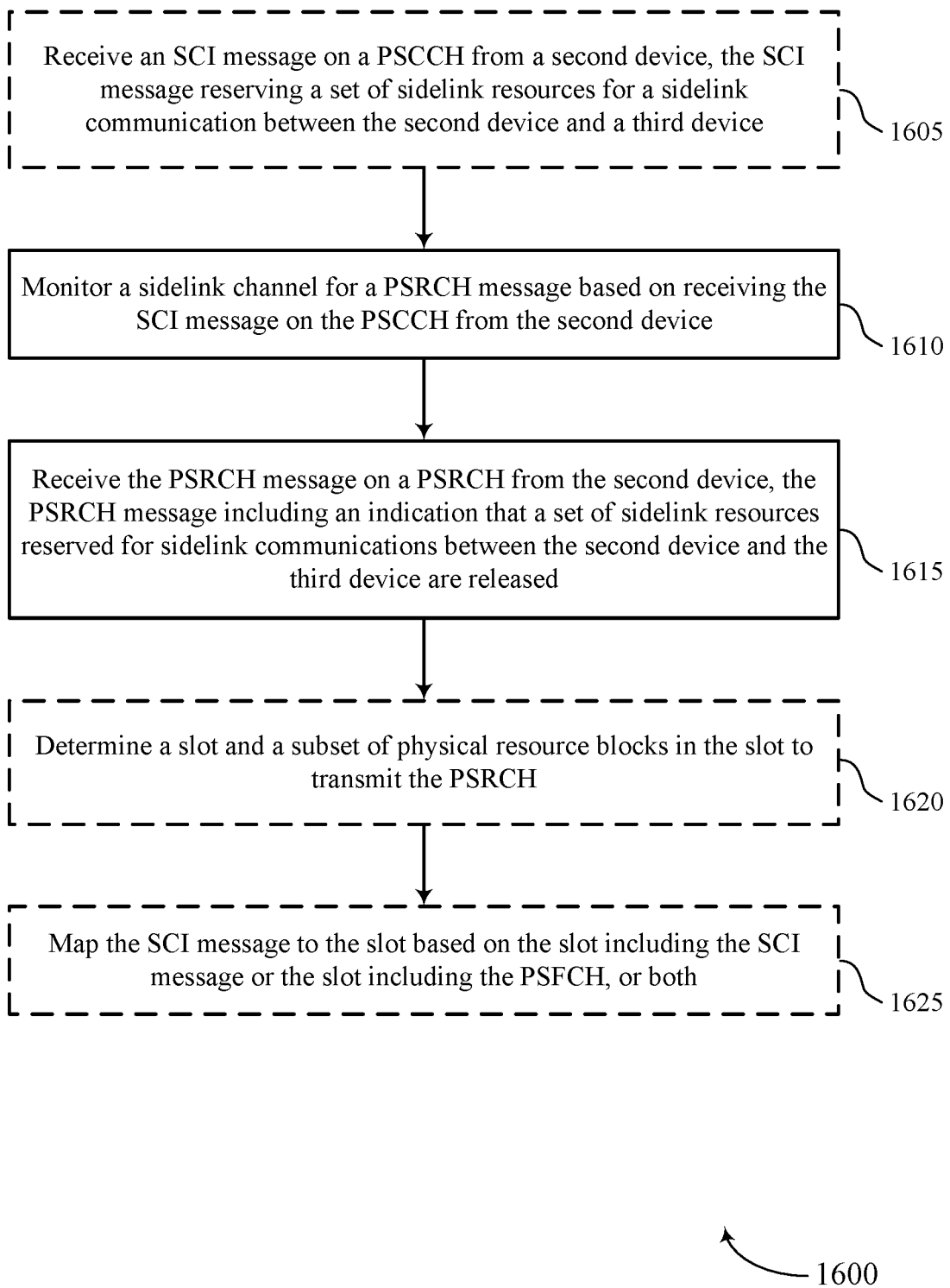

FIG. 16 shows a flowchart illustrating a method 1600 that supports techniques for releasing sidelink resources related to sidelink communications in accordance with one or more aspects of the present disclosure. The operations of method 1600 may be implemented by a device (e.g., a UE 115) or its components as described herein. For example, the operations of method 1600 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1605, the device may receive an SCI message on a PSCCH from a second device, the SCI message reserving a set of sidelink resources for a sidelink communication between the second device and a third device. The operations of 1605 may be performed according to the methods described herein. In some examples, aspects of the operations of 1605 may be performed by an SCI manager as described with reference to FIGS. 7 through 10.

At 1610, the device may monitor a sidelink channel for a PSRCH message based on receiving the SCI message on the PSCCH from the second device. The operations of 1610 may be performed according to the methods described herein. In some examples, aspects of the operations of 1610 may be performed by a monitoring component as described with reference to FIGS. 7 through 10.

At 1615, the device may receive the PSRCH message on a PSRCH from the second device, the PSRCH message including an indication that a set of sidelink resources reserved for sidelink communications between the second device and the third device are released. The operations of 1615 may be performed according to the methods described herein. In some examples, aspects of the operations of 1615 may be performed by a PSRCH manager as described with reference to FIGS. 7 through 10.

At 1620, the device may determine a slot and a subset of physical resource blocks in the slot to transmit the PSRCH. The operations of 1620 may be performed according to the methods described herein. In some examples, aspects of the operations of 1620 may be performed by a mapping component as described with reference to FIGS. 7 through 10.

At 1625, the device may map the SCI message to the slot based on the slot including the SCI message or the slot including the PSFCH, or both. The operations of 1625 may be performed according to the methods described herein. In some examples, aspects of the operations of 1625 may be performed by a mapping component as described with reference to FIGS. 7 through 10.

Figure 17:
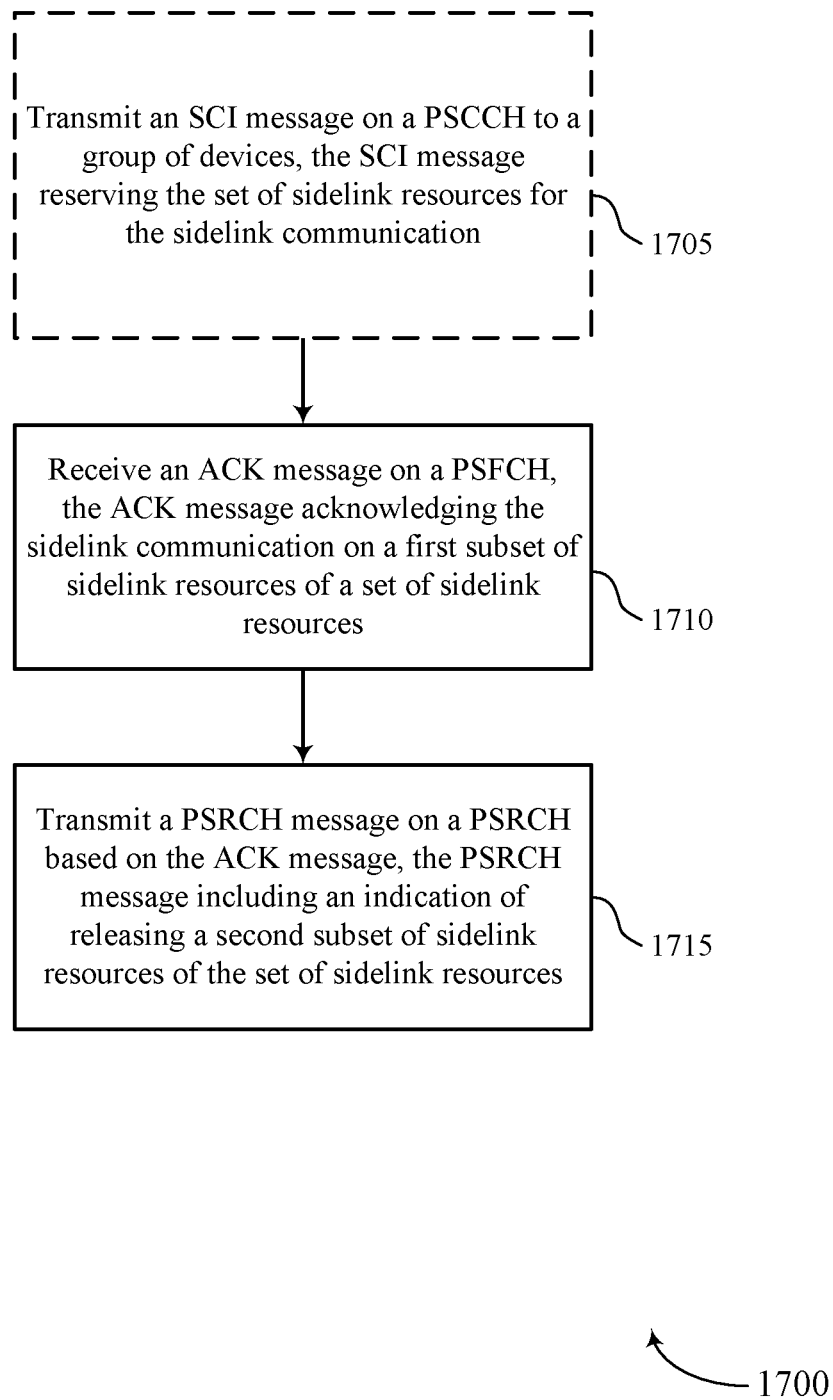

FIG. 17 shows a flowchart illustrating a method 1700 that supports techniques for releasing sidelink resources related to sidelink communications in accordance with one or more aspects of the present disclosure. The operations of method 1700 may be implemented by a device (e.g., a UE 115) or its components as described herein. For example, the operations of method 1700 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1705, the device may transmit an SCI message on a PSCCH to a group of devices, the SCI message reserving the set of sidelink resources for the sidelink communication. The operations of 1705 may be performed according to the methods described herein. In some examples, aspects of the operations of 1705 may be performed by an SCI manager as described with reference to FIGS. 7 through 10.

At 1710, the device may receive an ACK message on a PSFCH, the ACK message acknowledging the sidelink communication on a first subset of sidelink resources of a set of sidelink resources. The operations of 1710 may be performed according to the methods described herein. In some examples, aspects of the operations of 1710 may be performed by a release component as described with reference to FIGS. 7 through 10.

At 1715, the device may transmit a PSRCH message on a PSRCH based on the ACK message, the PSRCH message including an indication of releasing a second subset of sidelink resources of the set of sidelink resources. The operations of 1715 may be performed according to the methods described herein. In some examples, aspects of the operations of 1715 may be performed by a PSRCH manager as described with reference to FIGS. 7 through 10.

Figure 18:
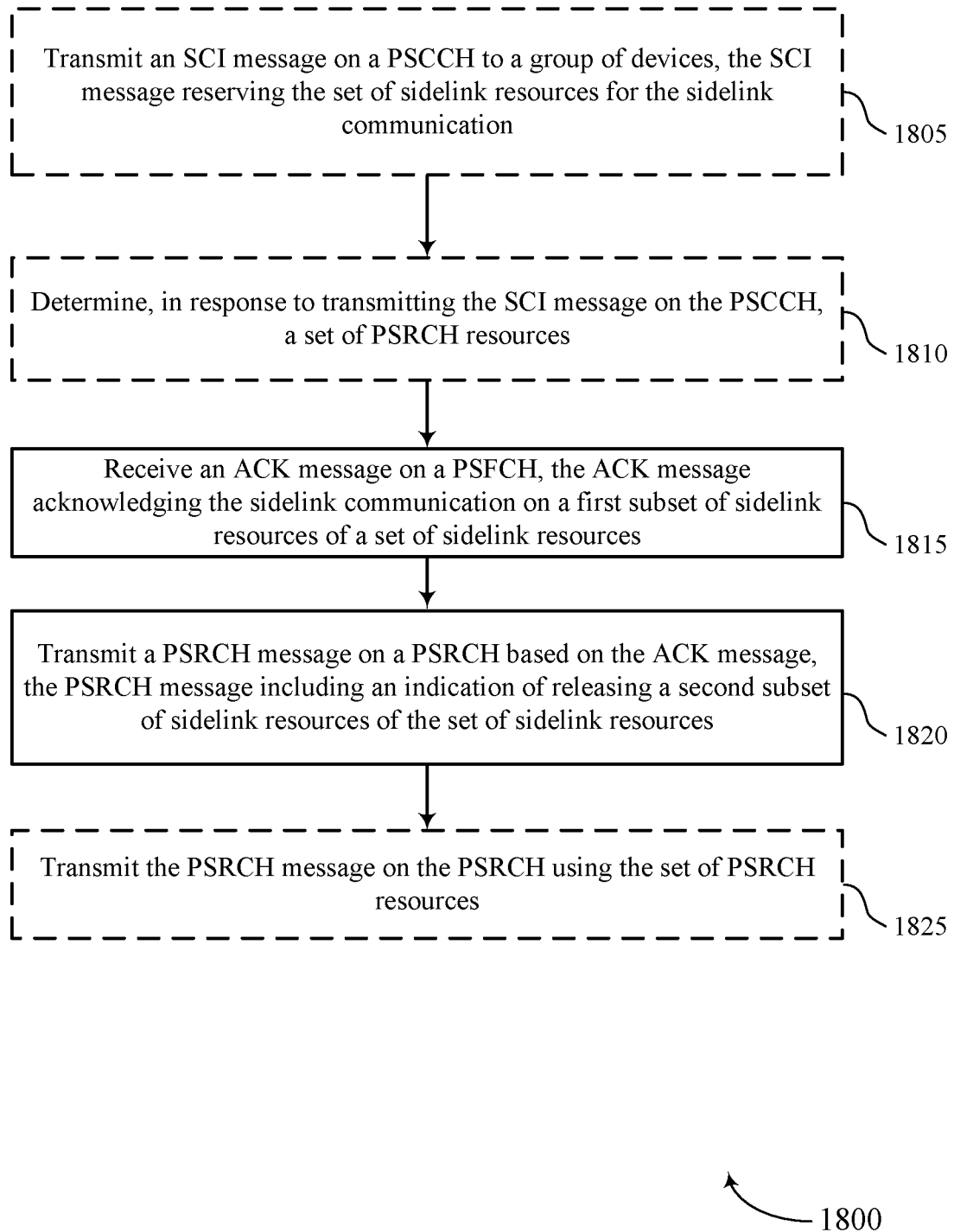

FIG. 18 shows a flowchart illustrating a method 1800 that supports techniques for releasing sidelink resources related to sidelink communications in accordance with one or more aspects of the present disclosure. The operations of method 1800 may be implemented by a device (e.g., a UE 115) or its components as described herein. For example, the operations of method 1800 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1805, the device may transmit an SCI message on a PSCCH to a group of devices, the SCI message reserving the set of sidelink resources for the sidelink communication. The operations of 1805 may be performed according to the methods described herein. In some examples, aspects of the operations of 1805 may be performed by an SCI manager as described with reference to FIGS. 7 through 10.

At 1810, the device may determine, in response to transmitting the SCI message on the PSCCH, a set of PSRCH resources. The operations of 1810 may be performed according to the methods described herein. In some examples, aspects of the operations of 1810 may be performed by a resource component as described with reference to FIGS. 7 through 10.

At 1815, the device may receive an ACK message on a PSFCH, the ACK message acknowledging the sidelink communication on a first subset of sidelink resources of a set of sidelink resources. The operations of 1815 may be performed according to the methods described herein. In some examples, aspects of the operations of 1815 may be performed by a release component as described with reference to FIGS. 7 through 10.

At 1820, the device may transmit a PSRCH message on a PSRCH based on the ACK message, the PSRCH message including an indication of releasing a second subset of sidelink resources of the set of sidelink resources. The operations of 1820 may be performed according to the methods described herein. In some examples, aspects of the operations of 1820 may be performed by a PSRCH manager as described with reference to FIGS. 7 through 10.

At 1825, the device may transmit the PSRCH message on the PSRCH using the set of PSRCH resources. The operations of 1825 may be performed according to the methods described herein. In some examples, aspects of the operations of 1825 may be performed by a resource component as described with reference to FIGS. 7 through 10.

Figure 19:
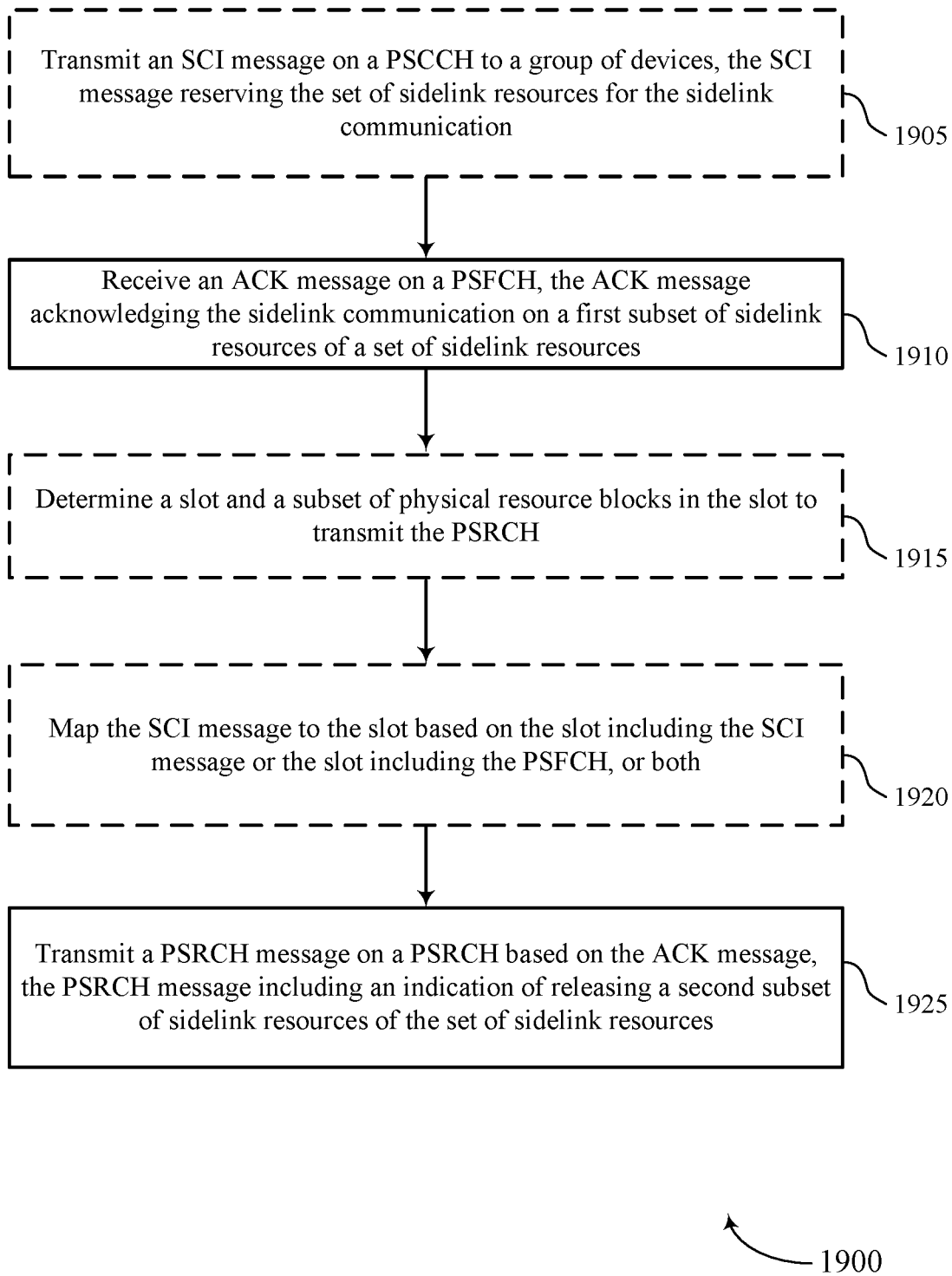

FIG. 19 shows a flowchart illustrating a method 1900 that supports techniques for releasing sidelink resources related to sidelink communications in accordance with one or more aspects of the present disclosure. The operations of method 1900 may be implemented by a device (e.g., a UE 115) or its components as described herein. For example, the operations of method 1900 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1905, the device may transmit an SCI message on a PSCCH to a group of devices, the SCI message reserving the set of sidelink resources for the sidelink communication. The operations of 1905 may be performed according to the methods described herein. In some examples, aspects of the operations of 1905 may be performed by an SCI manager as described with reference to FIGS. 7 through 10.

At 1910, the device may Receive an ACK message on a PSFCH, the ACK message acknowledging the sidelink communication on a first subset of sidelink resources of a set of sidelink resources. The operations of 1910 may be performed according to the methods described herein. In some examples, aspects of the operations of 1910 may be performed by a release component as described with reference to FIGS. 7 through 10.

At 1915, the device may determine a slot and a subset of physical resource blocks in the slot to transmit the PSRCH. The operations of 1915 may be performed according to the methods described herein. In some examples, aspects of the operations of 1915 may be performed by a mapping component as described with reference to FIGS. 7 through 10.

At 1920, the device may map the SCI message to the slot based on the slot including the SCI message or the slot including the PSFCH, or both. The operations of 1920 may be performed according to the methods described herein. In some examples, aspects of the operations of 1920 may be performed by a mapping component as described with reference to FIGS. 7 through 10.

At 1925, the device may transmit a PSRCH message on a PSRCH based on the ACK message, the PSRCH message including an indication of releasing a second subset of sidelink resources of the set of sidelink resources. The operations of 1925 may be performed according to the methods described herein. In some examples, aspects of the operations of 1925 may be performed by a PSRCH manager as described with reference to FIGS. 7 through 10.

Figure 20:
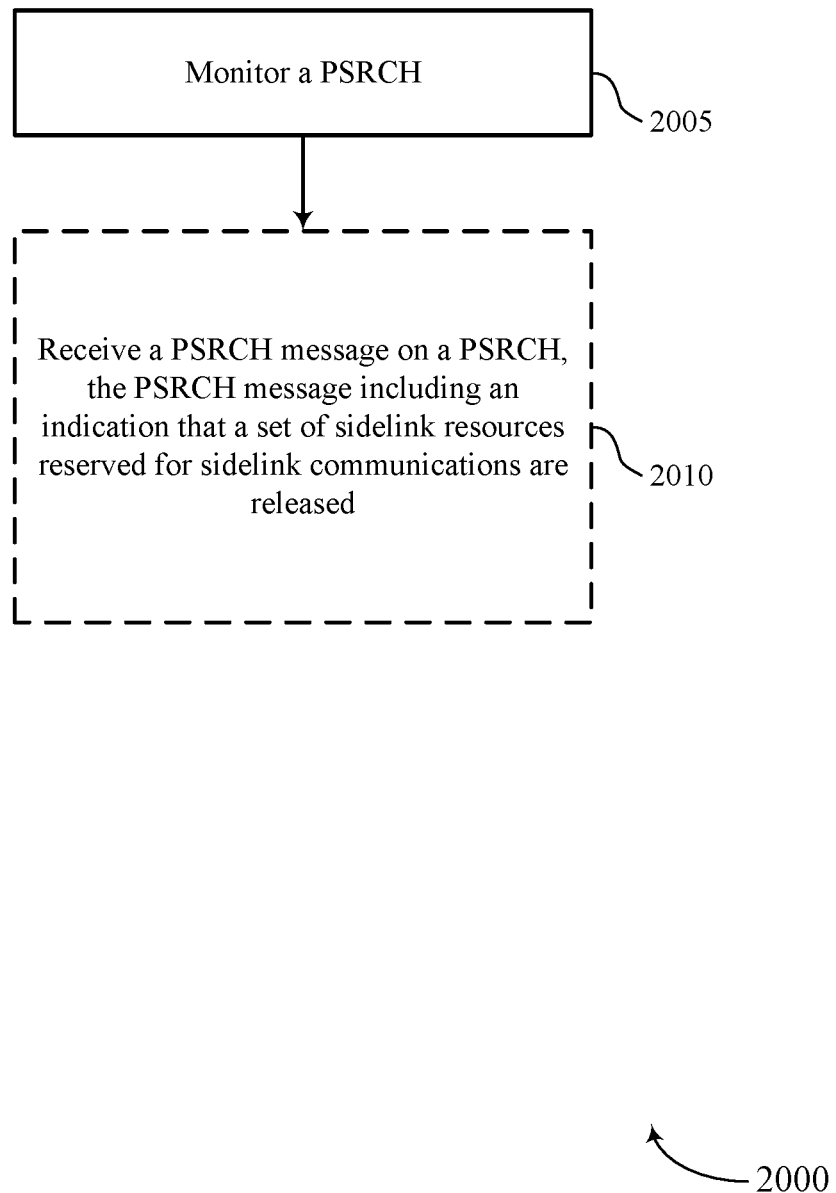

FIG. 20 shows a flowchart illustrating a method 2000 that supports techniques for releasing sidelink resources related to sidelink communications in accordance with one or more aspects of the present disclosure. The operations of method 2000 may be implemented by a device (e.g., a UE 115) or its components as described herein. For example, the operations of method 2000 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 2005, the device may monitor a PSRCH. The operations of 2005 may be performed according to the methods described herein. In some examples, aspects of the operations of 2005 may be performed by a monitoring component as described with reference to FIGS. 7 through 10.

At 2010, the device may receive a PSRCH message on a PSRCH, the PSRCH message including an indication that a set of sidelink resources reserved for sidelink communications are released. The operations of 2010 may be performed according to the methods described herein. In some examples, aspects of the operations of 2010 may be performed by a PSRCH manager as described with reference to FIGS. 7 through 10.

Figure 21:
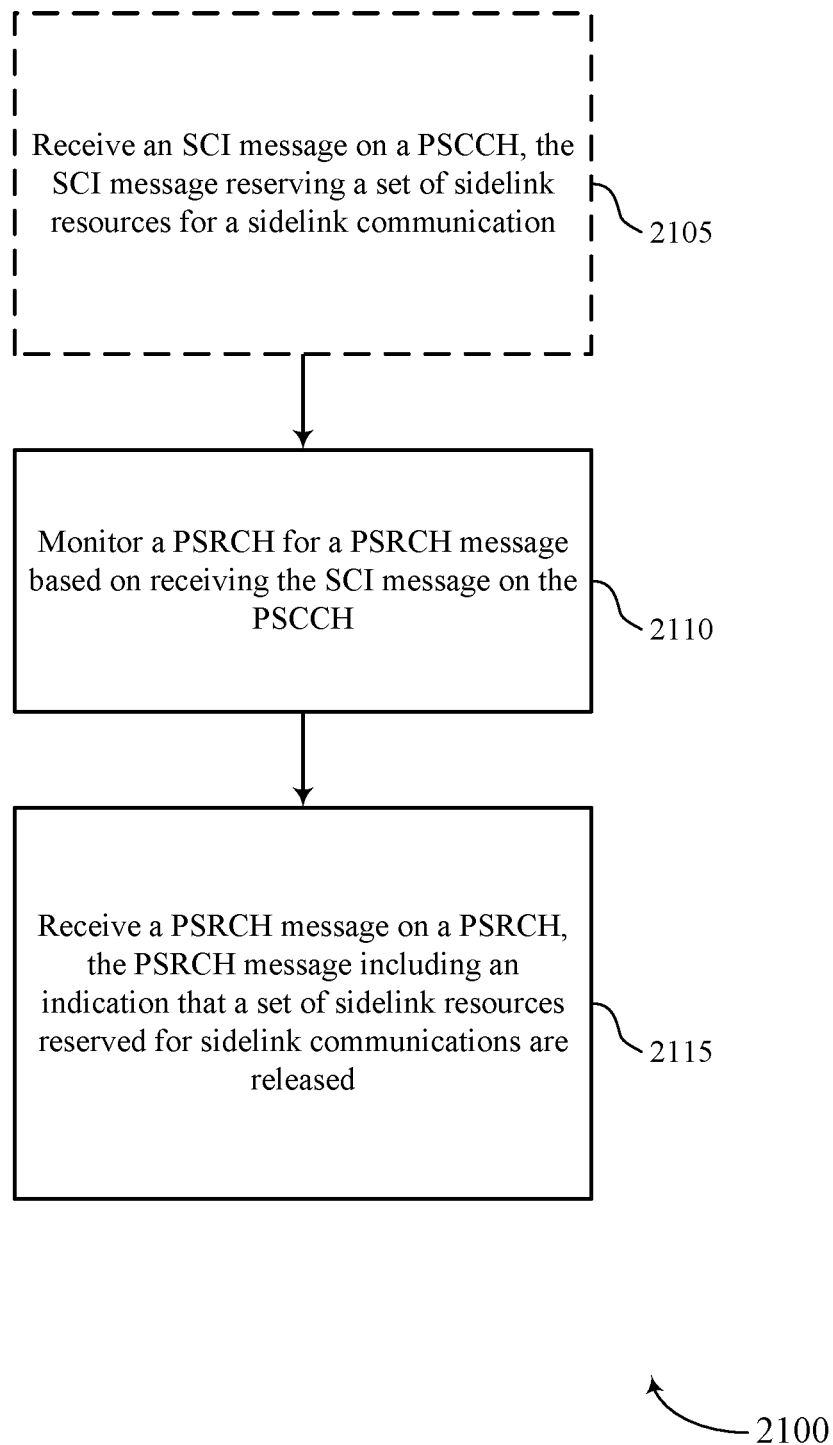

FIG. 21 shows a flowchart illustrating a method 2100 that supports techniques for releasing sidelink resources related to sidelink communications in accordance with one or more aspects of the present disclosure. The operations of method 2100 may be implemented by a device (e.g., a UE 115) or its components as described herein. For example, the operations of method 2100 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 2105, the device may receive an SCI message on a PSCCH, the SCI message reserving a set of sidelink resources for a sidelink communication. The operations of 2105 may be performed according to the methods described herein. In some examples, aspects of the operations of 2105 may be performed by an SCI manager as described with reference to FIGS. 7 through 10.

At 2110, the device may monitor a PSRCH for a PSRCH message based on receiving the SCI message on the PSCCH. The operations of 2110 may be performed according to the methods described herein. In some examples, aspects of the operations of 2110 may be performed by a monitoring component as described with reference to FIGS. 7 through 10.

At 2115, the device may receive a PSRCH message on a PSRCH, the PSRCH message including an indication that a set of sidelink resources reserved for sidelink communications are released. The operations of 2115 may be performed according to the methods described herein. In some examples, aspects of the operations of 2115 may be performed by a PSRCH manager as described with reference to FIGS. 7 through 10.

Figure 22:
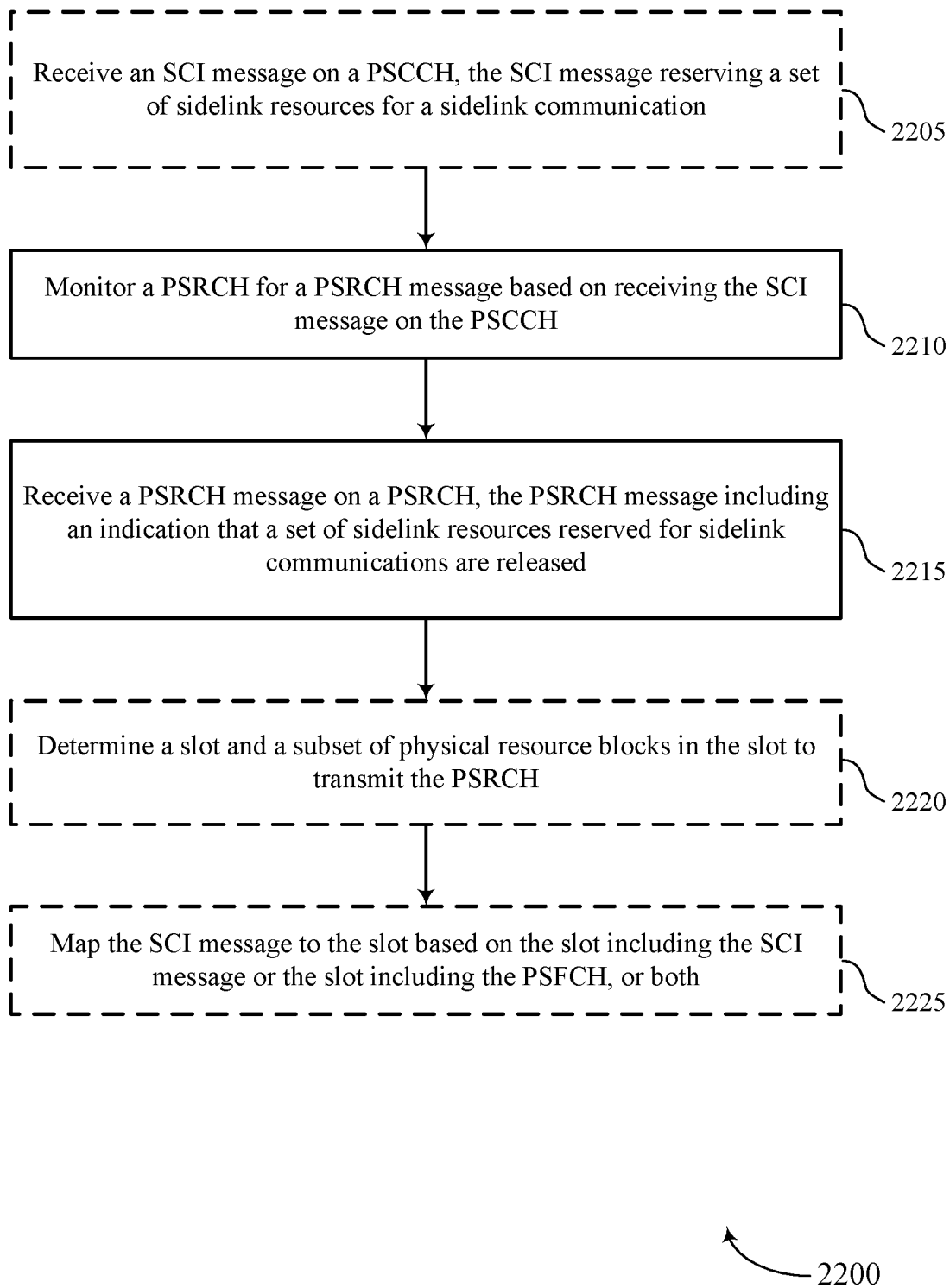

FIG. 22 shows a flowchart illustrating a method 2200 that supports techniques for releasing sidelink resources related to sidelink communications in accordance with one or more aspects of the present disclosure. The operations of method 2200 may be implemented by a device (e.g., a UE 115) or its components as described herein. For example, the operations of method 2200 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 2205, the device may receive an SCI message on a PSCCH, the SCI message reserving a set of sidelink resources for a sidelink communication. The operations of 2205 may be performed according to the methods described herein. In some examples, aspects of the operations of 2205 may be performed by an SCI manager as described with reference to FIGS. 7 through 10.

At 2210, the device may monitor a PSRCH for a PSRCH message based on receiving the SCI message on the PSCCH. The operations of 2210 may be performed according to the methods described herein. In some examples, aspects of the operations of 2210 may be performed by a monitoring component as described with reference to FIGS. 7 through 10.

At 2215, the device may receive a PSRCH message on a PSRCH, the PSRCH message including an indication that a set of sidelink resources reserved for sidelink communications are released. The operations of 2215 may be performed according to the methods described herein. In some examples, aspects of the operations of 2215 may be performed by a PSRCH manager as described with reference to FIGS. 7 through 10.

At 2220, the device may determine a slot and a subset of physical resource blocks in the slot to transmit the PSRCH. The operations of 2220 may be performed according to the methods described herein. In some examples, aspects of the operations of 2220 may be performed by a mapping component as described with reference to FIGS. 7 through 10.

At 2225, the device may map the SCI message to the slot based on the slot including the SCI message or the slot including the PSFCH, or both. The operations of 2225 may be performed according to the methods described herein. In some examples, aspects of the operations of 2225 may be performed by a mapping component as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous embodiments or aspects described herein.

Aspect 1: A method for sidelink communication at a first device in a wireless communication system, comprising: transmitting a SCI message on a PSCCH to a group of devices, the SCI message reserving a set of sidelink resources for the sidelink communication between the first device and a second device of the group of devices; releasing the set of sidelink resources based at least in part on receiving, from the second device, an ACK message on a PSFCH; and transmitting a PSRCH message on a PSRCH, the PSRCH message comprising an indication of the released set of sidelink resources.

Aspect 2: The method of aspect 1, further comprising: determining, in response to transmitting the SCI message on the PSCCH, a set of PSRCH resources; and transmitting the PSRCH message on the PSRCH using the set of PSRCH resources.

Aspect 3: The method of any one of aspects 1 and 2, further comprising: transmitting, in response to receiving the ACK message on the PSFCH, the PSRCH message on the PSRCH based at least in part on the ACK message comprising a positive ACK.

Aspect 4: The method of any one of aspects 1 through 3, further comprising: broadcasting, to the group of devices, the PSRCH message on the PSRCH.

Aspect 5: The method of aspect 4, further comprising: determining a power level to broadcast the PSRCH message on the PSRCH based at least in part on transmitting the SCI message on the PSCCH; and broadcasting, to the group of devices, the PSRCH message on the PSRCH using the determined power level.

Aspect 6: The method of any one of aspects 1 through 5, further comprising: determining a slot and a subset of physical resource blocks in the slot to transmit the PSRCH; and mapping the SCI message to the slot based at least in part on the slot including the SCI message or the slot including the PSFCH, or both.

Aspect 7: The method of aspect 6, further comprising: mapping the SCI message to a subset of physical resource blocks in the slot based at least in part on a beginning subchannel of the SCI message.

Aspect 8: The method of any one of aspects 1 through 7, further comprising: determining one or more information bits associated with the SCI message; and mapping the SCI message to the PSRCH message based at least in part on the determined one or more information bits associated with the SCI message.

Aspect 9: The method of aspect 8, further comprising: determining, in a slot, a subset of physical resource blocks associated with transmitting the PSRCH message; and mapping the SCI message to the PSRCH message based at least in part on the subset of physical resource blocks in the slot.

Aspect 10: The method of any one of aspects 1 through 9, further comprising: determining that one or more PSRCH resources associated with the PSRCH are periodic.

Aspect 11: The method of aspect 10, wherein the one or more PSRCH resources associated with the PSRCH are preconfigured.

Aspect 12: The method of any one of aspects 10 and 11, wherein a periodicity of the one or more PSRCH resources associated with the PSRCH relates to a periodicity of one or more PSFCH resources associated with the PSFCH.

Aspect 13: The method of any one of aspects 1 through 12, further comprising: determining that the PSRCH spans over all physical resource blocks of at least one symbol in a slot.

Aspect 14: The method of any one of aspects 1 through 13, further comprising: determining the PSRCH spans over a subset of physical resource blocks of at least one symbol in a slot associated with the PSFCH.

Aspect 15: The method of any one of aspects 1 through 14, further comprising: determining a physical resource block set associated with the PSRCH is orthogonal to a physical resource block set associated with the PSFCH in a slot.

Aspect 16: The method of any one of aspects 1 through 15, further comprising: mapping one or more PSRCH resources to a slot associated with the PSRCH following a previous slot associated with the PSFCH related to the SCI message.

Aspect 17: The method of any one of aspects 1 through 16, further comprising: mapping one or more PSRCH resources to a subset of physical resource blocks within one or more subchannels associated with the PSSCH related to the SCI message, the subset of physical resource blocks corresponds to a set of physical resource blocks configured for the PSRCH.

Aspect 18: The method of any one of aspects 1 through 17, further comprising: determining a common subset of physical resource blocks associated with the PSRCH; and mapping the SCI message to the PSRCH based at least in part on determining the common subset of physical resource blocks.

Aspect 19: The method of aspect 18, further comprising: mapping the SCI message to the PSRCH based at least in part on a modulo operation on a cyclic redundancy check bit of the SCI.

Aspect 20: The method of any one of aspects 1 through 19, further comprising: determining a format associated with the PSRCH message, the format comprising a cyclic-shift of a sequence; and transmitting the PSRCH message based at least in part on the format.

Aspect 21: The method of aspect 20, wherein the sequence comprises a Zadoff-Chu sequence.

Aspect 22: A method for sidelink communication at a first device in a wireless communication system, comprising: monitoring a sidelink channel; and receiving a PSRCH message on a PSRCH from a second device, the PSRCH message comprising an indication that a set of sidelink resources reserved for sidelink communications between the second device and a third device are released.

Aspect 23: The method of aspect 22, further comprising: receiving a SCI message on a PSCCH from the second device, the SCI message reserving the set of sidelink resources for the sidelink communication between the second device and the third device; and monitoring the sidelink channel for the PSRCH message based at least in part on receiving the SCI message on the PSCCH from the second device.

Aspect 24: The method of aspect 23, further comprising: determining, in response to receiving the SCI message on the PSCCH, a set of PSRCH resources; and receiving the PSRCH message on the PSRCH using the set of PSRCH resources.

Aspect 25: The method of any of aspects 23 and 24, further comprising: determining a slot and a subset of physical resource blocks in the slot to transmit the PSRCH; and mapping the SCI message to the slot based at least in part on the slot including the SCI message or the slot including the PSFCH, or both.

Aspect 26: The method of aspect 25, further comprising: mapping the SCI message to a subset of physical resource blocks in the slot based at least in part on a beginning subchannel of the SCI message.

Aspect 27: The method of any of aspects 23 through 26, further comprising: determining one or more information bits associated with the SCI message; and mapping the SCI message to the PSRCH message based at least in part on the determined one or more information bits associated with the SCI message.

Aspect 28: The method of aspect 27, further comprising: determining, in a slot, a subset of physical resource blocks associated with transmitting the PSRCH message; and mapping the SCI message to the PSRCH message based at least in part on the subset of physical resource blocks in the slot.

Aspect 29: The method of any of aspects 23 through 28, further comprising: determining that one or more PSRCH resources associated with the PSRCH are periodic.

Aspect 30: The method of aspect 29, wherein the one or more PSRCH resources associated with the PSRCH are preconfigured.

Aspect 31: The method of any of aspects 29 and 30, wherein a periodicity of the one or more PSRCH resources associated with the PSRCH relates to a periodicity of one or more PSFCH resources associated with a PSFCH.

Aspect 32: The method of any of aspects 22 through 31, further comprising: determining that the PSRCH spans over all physical resource blocks of at least one symbol in a slot.

Aspect 33: The method of any of aspects 22 through 32, further comprising: determining the PSRCH spans over a subset of physical resource blocks of at least one symbol in a slot associated with a PSFCH.

Aspect 34: The method of any of aspects 22 through 33, further comprising: determining a physical resource block set associated with the PSRCH is orthogonal to a physical resource block set associated with a PSFCH in a slot.

Aspect 35: The method of any of aspects 22 through 34, further comprising: mapping one or more PSRCH resources to a slot associated with the PSRCH following a previous slot associated with a PSFCH related to the SCI message.

Aspect 36: The method of any of aspects 22 through 35, further comprising: mapping one or more PSRCH resources to a subset of physical resource blocks within one or more subchannels associated with the PSSCH related to the SCI message, the subset of physical resource blocks corresponds to a set of physical resource blocks configured for the PSRCH.

Aspect 37: An apparatus for wireless communication comprising at least one means for performing a method of any one of aspects 1 through 21.

Aspect 38: An apparatus for wireless communication comprising a processor and memory coupled to the processor, the processor and memory configured to perform a method of any one of aspects 1 through 21.

Aspect 39: A non-transitory computer-readable medium storing code for wireless communication, the code comprising instructions executable by a processor to perform a method of any one of aspects 1 through 21.

Aspect 40: An apparatus for wireless communication comprising at least one means for performing a method of any one of aspects 22 through 36.

Aspect 41: An apparatus for wireless communication comprising a processor and memory coupled to the processor, the processor and memory configured to perform a method of any one of aspects 22 through 36.

Aspect 42: A non-transitory computer-readable medium storing code for wireless communication, the code comprising instructions executable by a processor to perform a method of any one of aspects 22 through 36.

Aspect 43: A method for sidelink communication at a device, comprising: receiving an acknowledgment message on a physical sidelink feedback channel, the acknowledgment message acknowledging the sidelink communication on a first subset of sidelink resources of a set of sidelink resources; and transmitting a physical sidelink release channel message on a physical sidelink release channel based at least in part on the acknowledgment message, the physical sidelink release channel message comprising an indication of releasing a second subset of sidelink resources of the set of sidelink resources.

Aspect 44: The method of aspect 43, further comprising: transmitting a sidelink control information message on a physical sidelink control channel to a group of devices, the sidelink control information message reserving the set of sidelink resources for the sidelink communication.

Aspect 45: The method of aspect 44, further comprising: determining, in response to transmitting the sidelink control information message on the physical sidelink control channel, a set of physical sidelink release channel resources; and transmitting the physical sidelink release channel message on the physical sidelink release channel using the set of physical sidelink release channel resources.

Aspect 46: The method of any of aspects 44 through 45, further comprising: broadcasting, to the group of devices, the physical sidelink release channel message on the physical sidelink release channel.

Aspect 47: The method of aspect 46, further comprising: determining a power level to broadcast the physical sidelink release channel message on the physical sidelink release channel based at least in part on transmitting the sidelink control information message on the physical sidelink control channel; and broadcasting, to the group of devices, the physical sidelink release channel message on the physical sidelink release channel using the determined power level.

Aspect 48: The method of any of aspects 44 through 47, further comprising: determining a slot and a subset of physical resource blocks in the slot to transmit the physical sidelink release channel; and mapping the sidelink control information message to the slot based at least in part on the slot including the sidelink control information message or the slot including the physical sidelink feedback channel, or both.

Aspect 49: The method of aspect 48, further comprising: mapping the sidelink control information message to the subset of physical resource blocks in the slot based at least in part on a beginning subchannel of the sidelink control information message.

Aspect 50: The method of any of aspects 44 through 49, further comprising: determining one or more information bits associated with the sidelink control information message; and mapping the sidelink control information message to the physical sidelink release channel message based at least in part on the determined one or more information bits associated with the sidelink control information message.

Aspect 51: The method of aspect 50, further comprising: determining, in a slot, a subset of physical resource blocks associated with transmitting the physical sidelink release channel message; and mapping the sidelink control information message to the physical sidelink release channel message based at least in part on the subset of physical resource blocks in the slot.

Aspect 52: The method of any of aspects 43 through 51, further comprising: mapping one or more physical sidelink release channel resources to a slot associated with the physical sidelink release channel following a previous slot associated with the physical sidelink feedback channel related to a sidelink control information message.

Aspect 53: The method of any of aspects 43 through 52, further comprising: mapping one or more physical sidelink release channel resources to a subset of physical resource blocks within one or more subchannels associated with a physical sidelink shared channel related to a sidelink control information message, the subset of physical resource blocks corresponds to a set of physical resource blocks configured for the physical sidelink release channel.

Aspect 54: The method of aspect 53, wherein one or more physical sidelink release channel resources associated with the physical sidelink release channel are periodic or preconfigured, or both, and a periodicity of the one or more physical sidelink release channel resources associated with the physical sidelink release channel relates to a periodicity of one or more physical sidelink feedback channel resources associated with the physical sidelink feedback channel.

Aspect 55: The method of any of aspects 43 through 54, further comprising: determining that the physical sidelink release channel spans over all physical resource blocks of at least one symbol in a slot.

Aspect 56: The method of any of aspects 43 through 55, further comprising: determining the physical sidelink release channel spans over a subset of physical resource blocks of at least one symbol in a slot associated with the physical sidelink feedback channel.

Aspect 57: The method of any of aspects 43 through 56, further comprising: determining a physical resource block set associated with the physical sidelink release channel is orthogonal to a physical resource block set associated with the physical sidelink feedback channel in a slot.

Aspect 58: The method of any of aspects 43 through 57, further comprising: determining a common subset of physical resource blocks associated with the physical sidelink release channel, wherein the common subset of physical resource blocks is shared for a group of devices; and mapping a sidelink control information message to the physical sidelink release channel based at least in part on determining the common subset of physical resource blocks.

Aspect 59: The method of aspect 58, further comprising: mapping the sidelink control information message to the physical sidelink release channel based at least in part on a modulo operation on a cyclic redundancy check bit of the sidelink control information message.

Aspect 60: The method of any of aspects 43 through 59, further comprising: determining a format associated with the physical sidelink release channel message, the format comprising a cyclic-shift of a sequence; and transmitting the physical sidelink release channel message based at least in part on the format.

Aspect 61: A method for sidelink communication at a device, comprising: monitoring a physical sidelink release channel; and receiving a physical sidelink release channel message on the physical sidelink release channel, the physical sidelink release channel message comprising an indication that a set of sidelink resources reserved for sidelink communication are released.

Aspect 62: The method of aspect 61, further comprising: receiving a sidelink control information message on a physical sidelink control channel, the sidelink control information message reserving the set of sidelink resources for the sidelink communication; and monitoring the physical sidelink release channel for the physical sidelink release channel message based at least in part on receiving the sidelink control information message on the physical sidelink control channel.

Aspect 63: The method of aspect 62, further comprising: determining, in response to receiving the sidelink control information message on the physical sidelink control channel, a set of physical sidelink release channel resources; and receiving the physical sidelink release channel message on the physical sidelink release channel using the set of physical sidelink release channel resources.

Aspect 64: The method of any of aspects 62 through 63, further comprising: determining a slot and a subset of physical resource blocks in the slot to transmit the physical sidelink release channel; and mapping the sidelink control information message to the slot based at least in part on the slot including the sidelink control information message or the slot including a physical sidelink feedback channel, or both.

Aspect 65: The method of aspect 64, further comprising: mapping the sidelink control information message to the subset of physical resource blocks in the slot based at least in part on a beginning subchannel of the sidelink control information message.

Aspect 66: The method of any of aspects 62 through 65, further comprising: determining one or more information bits associated with the sidelink control information message; and mapping the sidelink control information message to the physical sidelink release channel message based at least in part on the determined one or more information bits associated with the sidelink control information message.

Aspect 67: The method of aspect 66, further comprising: determining, in a slot, a subset of physical resource blocks associated with transmitting the physical sidelink release channel message; and mapping the sidelink control information message to the physical sidelink release channel message based at least in part on the subset of physical resource blocks in the slot.

Aspect 68: The method of any of aspects 62 through 67, further comprising: determining that one or more physical sidelink release channel resources associated with the physical sidelink release channel are periodic.

Aspect 69: The method of aspect 68, wherein the one or more physical sidelink release channel resources associated with the physical sidelink release channel are preconfigured.

Aspect 70: The method of any of aspects 68 through 69, wherein a periodicity of the one or more physical sidelink release channel resources associated with the physical sidelink release channel relates to a periodicity of one or more physical sidelink feedback channel resources associated with a physical sidelink feedback channel.

Aspect 71: An apparatus for sidelink communication at a device, comprising a processor; memory coupled with the processor; and instructions stored in the memory and executable by the processor to cause the apparatus to perform a method of any of aspects 43 through 60.

Aspect 72: An apparatus for sidelink communication at a device, comprising at least one means for performing a method of any of aspects 43 through 60.

Aspect 73: A non-transitory computer-readable medium storing code for sidelink communication at a device, the code comprising instructions executable by a processor to perform a method of any of aspects 43 through 60.

Aspect 74: An apparatus for sidelink communication at a device, comprising a processor; memory coupled with the processor; and instructions stored in the memory and executable by the processor to cause the apparatus to perform a method of any of aspects 61 through 70.

Aspect 75: An apparatus for sidelink communication at a device, comprising at least one means for performing a method of any of aspects 61 through 70.

Aspect 76: A non-transitory computer-readable medium storing code for sidelink communication at a device, the code comprising instructions executable by a processor to perform a method of any of aspects 45 through 70.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for sidelink communication at a first user equipment (UE), comprising:
 one or more memories; and
 one or more processors coupled with the one or more memories and individually or collectively configured to cause the first UE to:
 receive, from a second UE, an acknowledgment message on a physical sidelink feedback channel, the acknowledgment message acknowledges the sidelink communication on a first subset of sidelink resources of a set of sidelink resources reserved for the sidelink communication; and
 transmit, to a group of UEs comprising at least the second UE, a physical sidelink release channel message on a physical sidelink release channel based at least in part on the acknowledgment message, the physical sidelink release channel message comprising an indication of a release of a second subset of sidelink resources of the set of sidelink resources.

2. The apparatus of claim 1, wherein the one or more processors are individually or collectively configured to cause the first UE to:
transmit a sidelink control information message on a physical sidelink control channel to the group of UEs, the sidelink control information message reserves the set of sidelink resources for the sidelink communication.

3. The apparatus of claim 2, wherein the one or more processors are individually or collectively configured to cause the first UE to:
determine, in response to transmission of the sidelink control information message on the physical sidelink control channel, a set of physical sidelink release channel resources, wherein, to transmit the physical sidelink release channel message, the one or more processors are individually or collectively configured to cause the first UE to:
transmit the physical sidelink release channel message on the physical sidelink release channel via the set of physical sidelink release channel resources.

4. The apparatus of claim 2, wherein, to transmit the physical sidelink release channel message, the one or more processors are individually or collectively configured to cause the first UE to:
broadcast, to the group of UEs, the physical sidelink release channel message on the physical sidelink release channel.

5. The apparatus of claim 4, wherein the one or more processors are individually or collectively configured to cause the first UE to:
determine a power level to broadcast the physical sidelink release channel message on the physical sidelink release channel based at least in part on transmission of the sidelink control information message on the physical sidelink control channel, wherein, to transmit the physical sidelink release channel message, the one or more processors are individually or collectively configured to cause the first UE to:
broadcast, to the group of UEs, the physical sidelink release channel message on the physical sidelink release channel used the determined power level.

6. The apparatus of claim 2, wherein the one or more processors are individually or collectively configured to cause the first UE to:
determine a slot and a subset of physical resource blocks in the slot to transmit the physical sidelink release channel; and
map the sidelink control information message to the slot based at least in part on the slot including the sidelink control information message or the slot including the physical sidelink feedback channel, or both.

7. The apparatus of claim 6, wherein, to map the sidelink control information message, the one or more processors are individually or collectively configured to cause the first UE to:
map the sidelink control information message to the subset of physical resource blocks in the slot based at least in part on a beginning subchannel of the sidelink control information message.

8. The apparatus of claim 2, wherein the one or more processors are individually or collectively configured to cause the first UE to:
determine one or more information bits associated with the sidelink control information message; and
map the sidelink control information message to the physical sidelink release channel message based at least in part on the determined one or more information bits associated with the sidelink control information message.

9. The apparatus of claim 8, wherein the one or more processors are individually or collectively configured to cause the first UE to:
determine, in a slot, a subset of physical resource blocks associated with transmission of the physical sidelink release channel message, wherein, to map the sidelink control information message, the one or more processors are individually or collectively configured to cause the first UE to:
map the sidelink control information message to the physical sidelink release channel message based at least in part on the subset of physical resource blocks in the slot.

10. The apparatus of claim 1, wherein the one or more processors are individually or collectively configured to cause the first UE to:
map one or more physical sidelink release channel resources to a slot associated with the physical sidelink release channel that follows a previous slot associated with the physical sidelink feedback channel related to a sidelink control information message.

11. The apparatus of claim 1, wherein the one or more processors are individually or collectively configured to cause the first UE to:
map one or more physical sidelink release channel resources to a subset of physical resource blocks within one or more subchannels associated with a physical sidelink shared channel related to a sidelink control information message, the subset of physical resource blocks corresponds to a set of physical resource blocks configured for the physical sidelink release channel.

12. The apparatus of claim 1, wherein one or more physical sidelink release channel resources associated with the physical sidelink release channel are periodic or preconfigured, or both, and a periodicity of the one or more physical sidelink release channel resources associated with the physical sidelink release channel relates to a periodicity of one or more physical sidelink feedback channel resources associated with the physical sidelink feedback channel.

13. The apparatus of claim 1, wherein the one or more processors are individually or collectively configured to cause the first UE to:
determine that the physical sidelink release channel spans over all physical resource blocks of at least one symbol in a slot.

14. The apparatus of claim 1, wherein the one or more processors are individually or collectively configured to cause the first UE to:
determine the physical sidelink release channel spans over a subset of physical resource blocks of at least one symbol in a slot associated with the physical sidelink feedback channel.

15. The apparatus of claim 1, wherein the one or more processors are individually or collectively configured to cause the first UE to:
determine a physical resource block set associated with the physical sidelink release channel is orthogonal to a physical resource block set associated with the physical sidelink feedback channel in a slot.

16. The apparatus of claim 1, wherein the one or more processors are individually or collectively configured to cause the first UE to:

determine a common subset of physical resource blocks associated with the physical sidelink release channel, the common subset of physical resource blocks is shared for the group of UEs; and map a sidelink control information message to the physical sidelink release channel based at least in part on the determination of the common subset of physical resource blocks.

17. The apparatus of claim 16, wherein, to map the sidelink control information message, the one or more processors are individually or collectively configured to cause the first UE to:

map the sidelink control information message to the physical sidelink release channel based at least in part on a modulo operation on a cyclic redundancy check bit of the sidelink control information message.

18. The apparatus of claim 1, wherein the one or more processors are individually or collectively configured to cause the first UE to:

determine a format associated with the physical sidelink release channel message, the format comprising a cyclic-shift of a sequence, the apparatus comprising an antenna array configured to transmit the physical sidelink release channel message based at least in part on the format.

19. An apparatus for sidelink communication at a second user equipment (UE), comprising:

one or more memories; and one or more processors coupled with the one or more memories and individually or collectively configured to cause the second UE to:

monitor a physical sidelink release channel; and receive, from a first UE, a physical sidelink release channel message on the physical sidelink release channel, the physical sidelink release channel message comprising an indication that a set of sidelink resources reserved for the sidelink communication is released.

20. The apparatus of claim 19, wherein the one or more processors are individually or collectively configured to cause the second UE to:

receive a sidelink control information message on a physical sidelink control channel, the sidelink control information message reserves the set of sidelink resources for the sidelink communication, wherein, to monitor the physical sidelink release channel, the one or more processors are individually or collectively configured to cause the second UE to:

monitor the physical sidelink release channel for the physical sidelink release channel message based at least in part on reception of the sidelink control information message on the physical sidelink control channel.

21. The apparatus of claim 20, wherein the one or more processors are individually or collectively configured to cause the second UE to:

determine one or more information bits associated with the sidelink control information message; and map the sidelink control information message to the physical sidelink release channel message based at least in part on the determined one or more information bits associated with the sidelink control information message.

22. The apparatus of claim 21, wherein the one or more processors are individually or collectively configured to cause the second UE to:

determine, in a slot, a subset of physical resource blocks associated with transmission of the physical sidelink release channel message, wherein, to map the sidelink control information message, the one or more processors are individually or collectively configured to cause the second UE to:

map the sidelink control information message to the physical sidelink release channel message based at least in part on the subset of physical resource blocks in the slot.

23. The apparatus of claim 20, wherein the one or more processors are individually or collectively configured to cause the second UE to:

determine that one or more physical sidelink release channel resources associated with the physical sidelink release channel are periodic.

24. The apparatus of claim 23, the one or more physical sidelink release channel resources associated with the physical sidelink release channel are preconfigured.

25. The apparatus of claim 23, wherein a periodicity of the one or more physical sidelink release channel resources associated with the physical sidelink release channel relates to a periodicity of one or more physical sidelink feedback channel resources associated with a physical sidelink feedback channel.

26. The apparatus of claim 20, wherein the one or more processors are individually or collectively configured to cause the second UE to:

determine, in response to reception of the sidelink control information message on the physical sidelink control channel, a set of physical sidelink release channel resources, wherein, to receive the physical sidelink release channel message, the one or more processors are individually or collectively configured to cause the second UE to:

receive the physical sidelink release channel message on the physical sidelink release channel via the set of physical sidelink release channel resources.

27. The apparatus of claim 20, wherein the one or more processors are individually or collectively configured to cause the second UE to:

determine a slot and a subset of physical resource blocks in the slot to transmit the physical sidelink release channel; and map the sidelink control information message to the slot based at least in part on the slot including the sidelink control information message or the slot including a physical sidelink feedback channel, or both.

28. The apparatus of claim 27, wherein, to map the sidelink control information message, the one or more processors are individually or collectively configured to cause the second UE to:

map the sidelink control information message to the subset of physical resource blocks in the slot based at least in part on a beginning subchannel of the sidelink control information message.

29. A method for sidelink communication at a first user equipment (UE), comprising:

receiving, from a second UE, an acknowledgment message on a physical sidelink feedback channel, the acknowledgment message acknowledging the sidelink communication on a first subset of sidelink resources of a set of sidelink resources reserved for the sidelink communication; and transmitting, to a group of UEs comprising at least the second UE, a physical sidelink release channel message on a physical sidelink release channel based at least in part on the acknowledgment message, the physical sidelink release channel message comprising an indication of releasing a second subset of sidelink resources of the set of sidelink resources.

30. The method of claim 29, further comprising:
transmitting a sidelink control information message on a physical sidelink control channel to the group of UEs, the sidelink control information message reserving the set of sidelink resources for the sidelink communication.

31. The method of claim 30, further comprising:
determining, in response to transmitting the sidelink control information message on the physical sidelink control channel, a set of physical sidelink release channel resources, the transmitting the physical sidelink release channel message comprising:
transmitting the physical sidelink release channel message on the physical sidelink release channel via the set of physical sidelink release channel resources.

32. The method of claim 30, the transmitting the physical sidelink release channel message comprising:
broadcasting, to the group of UEs, the physical sidelink release channel message on the physical sidelink release channel.

33. A method for sidelink communication at a second user equipment (UE), comprising:
monitoring a physical sidelink release channel; and
receiving, from a first UE, a physical sidelink release channel message on the physical sidelink release channel, the physical sidelink release channel message comprising an indication that a set of sidelink resources reserved for the sidelink communication is released.

34. The method of claim 33, further comprising:
receiving a sidelink control information message on a physical sidelink control channel, the sidelink control information message reserving the set of sidelink resources for the sidelink communication, the monitoring the physical sidelink release channel comprising:
monitoring the physical sidelink release channel for the physical sidelink release channel message based at least in part on receiving the sidelink control information message on the physical sidelink control channel.

35. The method of claim 34, further comprising:
determining, in response to receiving the sidelink control information message on the physical sidelink control channel, a set of physical sidelink release channel resources, the receiving the physical sidelink release channel message comprising:
receiving the physical sidelink release channel message on the physical sidelink release channel via the set of physical sidelink release channel resources.

36. The method of claim 34, further comprising:
determining a slot and a subset of physical resource blocks in the slot to transmit the physical sidelink release channel; and
mapping the sidelink control information message to the slot based at least in part on the slot including the sidelink control information message or the slot including a physical sidelink feedback channel, or both.

37. A non-transitory computer-readable medium storing code for sidelink communication at a first user equipment (UE), the code comprising instructions executable by one or more processors to:
receive, from a second UE, an acknowledgment message on a physical sidelink feedback channel, the acknowledgment message acknowledges the sidelink communication on a first subset of sidelink resources of a set of sidelink resources reserved for the sidelink communication; and
transmit, to a group of UEs comprising at least the second UE, a physical sidelink release channel message on a physical sidelink release channel based at least in part on the acknowledgment message, the physical sidelink release channel message comprising an indication of a release of a second subset of sidelink resources of the set of sidelink resources.

38. The non-transitory computer-readable medium of claim 37, wherein the instructions are executable by the one or more processors to:
transmit a sidelink control information message on a physical sidelink control channel to the group of UEs, the sidelink control information message reserves the set of sidelink resources for the sidelink communication.

39. The non-transitory computer-readable medium of claim 38, wherein the instructions are executable by the one or more processors to:
determine, in response to transmission of the sidelink control information message on the physical sidelink control channel, a set of physical sidelink release channel resources, wherein the instructions to transmit the physical sidelink release channel message are executable by the one or more processors to:
transmit the physical sidelink release channel message on the physical sidelink release channel via the set of physical sidelink release channel resources.

40. The non-transitory computer-readable medium of claim 38, wherein the instructions to transmit the physical sidelink release channel message are executable by the one or more processors to:
broadcast, to the group of UEs, the physical sidelink release channel message on the physical sidelink release channel.

41. A non-transitory computer-readable medium storing code for sidelink communication at a second user equipment (UE), the code comprising instructions executable by one or more processors to:
monitor a physical sidelink release channel; and
receive, from a first UE, a physical sidelink release channel message on the physical sidelink release channel, the physical sidelink release channel message comprising an indication that a set of sidelink resources reserved for the sidelink communication is released.

42. The non-transitory computer-readable medium of claim 41, wherein the instructions are executable by the one or more processors to:
receive a sidelink control information message on a physical sidelink control channel, the sidelink control information message reserves the set of sidelink resources for the sidelink communication, wherein the instructions to monitor the physical sidelink release channel are executable by the one or more processors to:
monitor the physical sidelink release channel for the physical sidelink release channel message based at least in part on reception of the sidelink control information message on the physical sidelink control channel.

43. The non-transitory computer-readable medium of claim 42, wherein the instructions are executable by the one or more processors to:
determine, in response to reception of the sidelink control information message on the physical sidelink control channel, a set of physical sidelink release channel resources, wherein the instructions to receive the physical sidelink release channel message are executable by the one or more processors to:

receive the physical sidelink release channel message on the physical sidelink release channel via the set of physical sidelink release channel resources.

44. The non-transitory computer-readable medium of claim 42, wherein the instructions are executable by the one or more processors to:

determine a slot and a subset of physical resource blocks in the slot to transmit the physical sidelink release channel; and map the sidelink control information message to the slot based at least in part on the slot including the sidelink control information message or the slot including a physical sidelink feedback channel, or both.

* * * * *